(12) United States Patent
Harada et al.

(10) Patent No.: US 7,075,417 B2
(45) Date of Patent: Jul. 11, 2006

(54) TIRE PRESSURE DETECTING SYSTEM

(75) Inventors: Tomoyuki Harada, Saitama (JP);
Toshio Yamagiwa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 540 days.

(21) Appl. No.: 10/319,607

(22) Filed: Dec. 16, 2002

(65) Prior Publication Data
US 2004/0233049 A1 Nov. 25, 2004

(30) Foreign Application Priority Data

| Dec. 17, 2001 | (JP) | ............................. 2001-382793 |
| Dec. 17, 2001 | (JP) | ............................. 2001-382799 |
| Dec. 17, 2001 | (JP) | ............................. 2001-382808 |
| Jul. 16, 2002 | (JP) | ............................. 2002-206884 |
| Jul. 16, 2002 | (JP) | ............................. 2002-206937 |

(51) Int. Cl.
*B60C 23/00* (2006.01)
(52) U.S. Cl. ..................... 340/442; 340/445; 340/447; 73/146.4
(58) Field of Classification Search ................. 340/442
See application file for complete search history.

(56) References Cited

U.S. PATENT DOCUMENTS

| 4,186,377 | A | 1/1980 | Barabino | ................... 340/446 |
| 4,909,074 | A | * 3/1990 | Gerresheim et al. | ....... 73/146.4 |
| 5,231,872 | A | * 8/1993 | Bowler et al. | .............. 73/146.5 |
| 5,473,938 | A | 12/1995 | Handfield et al. | .......... 340/445 |
| 5,895,846 | A | 4/1999 | Chamussy et al. | ......... 73/146.2 |
| 5,965,808 | A | 10/1999 | Normann et al. | ........... 340/447 |
| 2003/0074961 | A1* | 4/2003 | Fischer et al. | ................ 73/146 |

FOREIGN PATENT DOCUMENTS

| EP | 0 989 001 | 3/2000 |
| EP | 1 024 034 | 8/2000 |
| EP | 1 092 570 | 4/2001 |
| EP | 1 216 854 | 6/2002 |
| JP | 10-44726 | 2/1988 |
| WO | WO 99/61265 | 12/1999 |

\* cited by examiner

*Primary Examiner*—Donnie L. Crosland
(74) *Attorney, Agent, or Firm*—Birch, Stewart, Kolasch, & Birch, LLP

(57) ABSTRACT

A fluctuation warning unit for issuing a warning when fluctuations of the tire pressure per unit time exceed a predetermined threshold fluctuation, and a detected value warning unit for issuing a warning when a detected value of the tire pressure has fallen to a value below a predetermined threshold detected value are provided. For example, air leakage may be recognized rapidly, and abnormalities of air pressure may be recognized even when a faint air leakage occurs wherein fluctuations of the tire pressure per unit time do not exceed the predetermined threshold fluctuation.

21 Claims, 16 Drawing Sheets

TIRE PRESSURE DETECTING SYSTEM

CROSS-REFERENCE TO RELATED APPLICATIONS

The present nonprovisional application claims priority under 35 USC 119 to Japanese Patent Application No. 2001-382793 filed on Dec. 17, 2001, Japanese Patent Application No. 2001-382799 filed on Dec. 17, 2001, Japanese Patent Application No. 2002-206884 filed on Jul. 16, 2002, Japanese Patent Application No. 2001-382808 filed on Dec. 17, 2001 and Japanese Patent Application No. 2002-206937 filed on Jul. 16, 2001 the entire contents thereof is hereby incorporated by reference.

BACKGROUND OF THE INVENTION

1. Field of the Invention

The present invention relates to a tire pressure detecting system for detecting a tire pressure and enabling a driver to recognize the tire pressure even when a vehicle is moving.

2. Description of Related Art

As one of tire pressure detecting systems that enable the driver to recognize the tire pressure even when the vehicle is moving, for example, a "TIRE PRESSURE ALARM SYSTEM" disclosed in JP-A-10-44726 is known.

The above-described technique proposes the tire pressure alarm system for measuring tire pressures including: a valve stem for inflating a tire; a case being disposed at the base of the valve stem; and a transmission unit having a pressure detecting unit, a signal processing circuit and a battery and being stored in a case, wherein the driver is notified when an abnormality is found in the tire pressure or when the tire pressure has fallen to a value below a predetermined value.

However, with the tire pressure alarm system described above, notification is only made, for example, when the tire pressure has fallen to the value below the predetermined value.

The tire pressure may fall gradually, abruptly, and at a speed in-between, depending on the cases.

For example, when a minute hole is formed on a tire, and thus air leakage occurs, the tire pressure falls gradually. However, it may not be sufficient if it is determined to be normal because the tire pressure is not less than a threshold value of the pressure.

In the tire pressure alarm system described above, in many cases, a time interval until alarm or the like is issued for notifying the driver that the tire pressure has fallen to a value below the predetermined value is set to a long time interval in order to reduce consumption of the battery.

However, if the time interval until the alarm or the like issued is kept long even for the cases when the air pressure in the tire has abruptly fallen and the rate of reduction of the tire pressure per unit time is outstandingly high, it is difficult to notify the user of an abnormality when the tire pressure has fallen in a short time. There may be a case in which the tire pressure becomes zero before the alarm is issued. In other words, a technique to notify the driver quickly when the pressure has abruptly fallen to a value below the threshold pressure is desired.

In addition, when the pressure detecting unit is a sensor employing a diaphragm and the like, it is exposed on one side to the ambient air, and on the other side to the interior of the tire. Therefore, the tire pressure indicated by the sensor may be an inappropriate value due to the ambient air pressure, which will be described in conjunction with figures shown below.

FIG. 16a is explanatory drawings illustrating an example of an air pressure sensor used for the tire pressure alarm system of the related art. Although the air pressure sensor shown here is a manometer for convenience, it may be a tire pressure gauge that is commercially available.

An air pressure sensor 401 is the sensor exposed on one side to the ambient air and on the other side to the interior of a tire 402. The air pressure of the tire 402 is set to 200 kPa in gauge pressure at high altitudes of 80 kPa for ambient air pressure. In this case, the air pressure is 280 kPa in an absolute pressure.

FIG. 16b is explanatory drawings illustrating an example of an air pressure sensor used for the tire pressure alarm system of the related art. Although the air pressure sensor shown here is a manometer for convenience, it may be a tire pressure gauge that is commercially available.

The tire 402 set to 200 kPa in air pressure at high altitudes of 80 kPa for ambient pressure is moved to a level ground of 100 kPa in ambient pressure as shown by an outline arrow. The air pressure in the tire 402 is stable at 280 kPa in absolute pressure, but becomes 180 kPa in gauge pressure.

In other words, when a vehicle wherein the tire pressure (gauge pressure) is set at a high altitude under low ambient air pressure is moved to the level ground under the ambient air pressure higher than the pressure at high altitudes, the value of the indicated tire pressure (gauge pressure) is lower by an amount corresponding to an increase in the ambient air pressure. In contrast thereto, when the vehicle wherein the tire pressure (gauge pressure) is set at the level ground under a normal atmospheric pressure is moved to high altitudes under low ambient pressure, the value of the indicated tire pressure (gauge pressure) is higher by an amount corresponding to a decrease in the ambient air pressure.

Therefore, it is desired that the tire pressure alarm system issues a warning when the value of the tire pressure (gauge pressure) has fallen to a value below a value predetermined under certain conditions both at high altitudes and at level ground.

SUMMARY AND OBJECTS OF THE INVENTION

Accordingly, it is a first object of the present invention to provide the tire pressure detecting system that is capable of recognizing an occurrence of air leakage or the like in the tire before the tire pressure has fallen to the value below the predetermined value.

It is a second object of the present invention to provide a tire pressure detecting system that is capable of quickly notifying of an abrupt air leakage or the like.

It is a third object of the present invention to provide a tire pressure detecting system that issues a warning when the tire pressure has fallen to a value below the predetermined value under certain conditions.

In a first aspect of the present invention, there is provided a tire pressure detecting system wherein a tire pressure is detected by an air pressure sensor. The detected tire pressure may be recognized by a device that includes a fluctuation warning unit for issuing a warning when fluctuations of the tire pressure per unit time exceeds a predetermined threshold fluctuation, and a detected value warning unit for issuing a warning when the detected value of the tire pressure has fallen to a value below a predetermined threshold detected value.

It is preferable if the occurrence of air leakage in the tire can be recognized before the tire pressure has fallen to a value below the predetermined value when the vehicle is moving.

Therefore, by providing the fluctuation warning unit for issuing a warning when fluctuations of the tire pressure per unit time exceed the predetermined threshold fluctuation, an occurrence of air leakage may be recognized quickly. As a consequence, a countermeasure may be taken at the timing where variation of the tire pressure is small.

In addition, by providing the detected value warning unit for issuing a warning when the detected value of the tire pressure has fallen to a value below the predetermined threshold detected value, abnormalities of air pressure may be recognized even when a faint air leakage that produces a fluctuation of the tire pressure per unit time does not exceed the predetermined threshold fluctuation. As a consequence, a convenience for tire pressure management for the driver may be improved.

In the second aspect of the present invention, there is provided a tire pressure detecting system of a type in which the tire pressure is detected by an air pressure sensor disposed on the wheel side, detected information on the tire pressure is issued from a transmitter disposed on the wheel side to a receiver disposed on the vehicle body side, and a warning is issued when the received tire pressure is outside the predetermined value. The transmitter includes a temperature sensor for detecting air temperatures in the tire, a pressure converting unit for converting the tire pressure detected by the air pressure sensor into a pressure at a predetermined temperature based on the air temperature detected by the temperature sensor, and a transmission interval varying unit for shortening the interval of issuing a warning to the receiver when the converted pressure supplied from the pressure converting unit has fallen to a value below a predetermined threshold pressure.

When detecting the tire pressure and notifying the detected tire pressure to the driver, it is preferable if this process may be performed accurately and quickly even when the vehicle is moving.

Therefore, the temperature sensor for detecting the air temperature in the tire, and the pressure converting unit for converting the tire pressure detected by the air pressure sensor into a pressure at the predetermined temperature based on the air temperature detected by the temperature sensor are provided in the transmitter so that a temperature correction is made to the tire pressure to be detected. As a consequence, air leakage may be accurately detected by removing a false tire pressure-maintaining phenomenon caused by increase in tire pressure due to an increase in temperature when air leakage has occurred.

Since the transmitter includes the transmission interval varying unit for shortening the interval of transmission to the receiver when the converted pressure from the pressure converting unit has fallen to a value below the predetermined threshold pressure, abrupt air leakage or the like may be notified quickly. As a consequence, the convenience of tire pressure management for the driver may be improved.

In a third aspect of the invention, there is provided a tire pressure detecting system wherein the tire pressure is detected by an air pressure sensor, and a warning is issued when the tire pressure lies outside a predetermined value. An ambient air pressure sensor is provided for detecting ambient air pressures, and a pressure converting unit is provided for converting the tire pressure detected by the air pressure sensor into a pressure under the reference atmospheric pressure based on the ambient air pressure detected by the ambient air pressure sensor.

It is preferable if a warning is issued when the tire pressure lies outside the value predetermined under certain conditions regardless of whether it is at high altitudes or on level ground by taking variations in the tire pressure due to the influence of the ambient air pressure into consideration.

Therefore, the system is adapted to detect the ambient air pressure by the ambient air pressure sensor, and to convert the tire pressure detected by the air pressure sensor into a pressure under the reference atmospheric pressure based on the ambient air pressure by the pressure converting unit. Accordingly, a warning is issued when the tire pressure lies outside the value predetermined under certain conditions regardless of whether it is at high altitudes or on level ground. As a consequence, the convenience of tire pressure management for the driver may be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
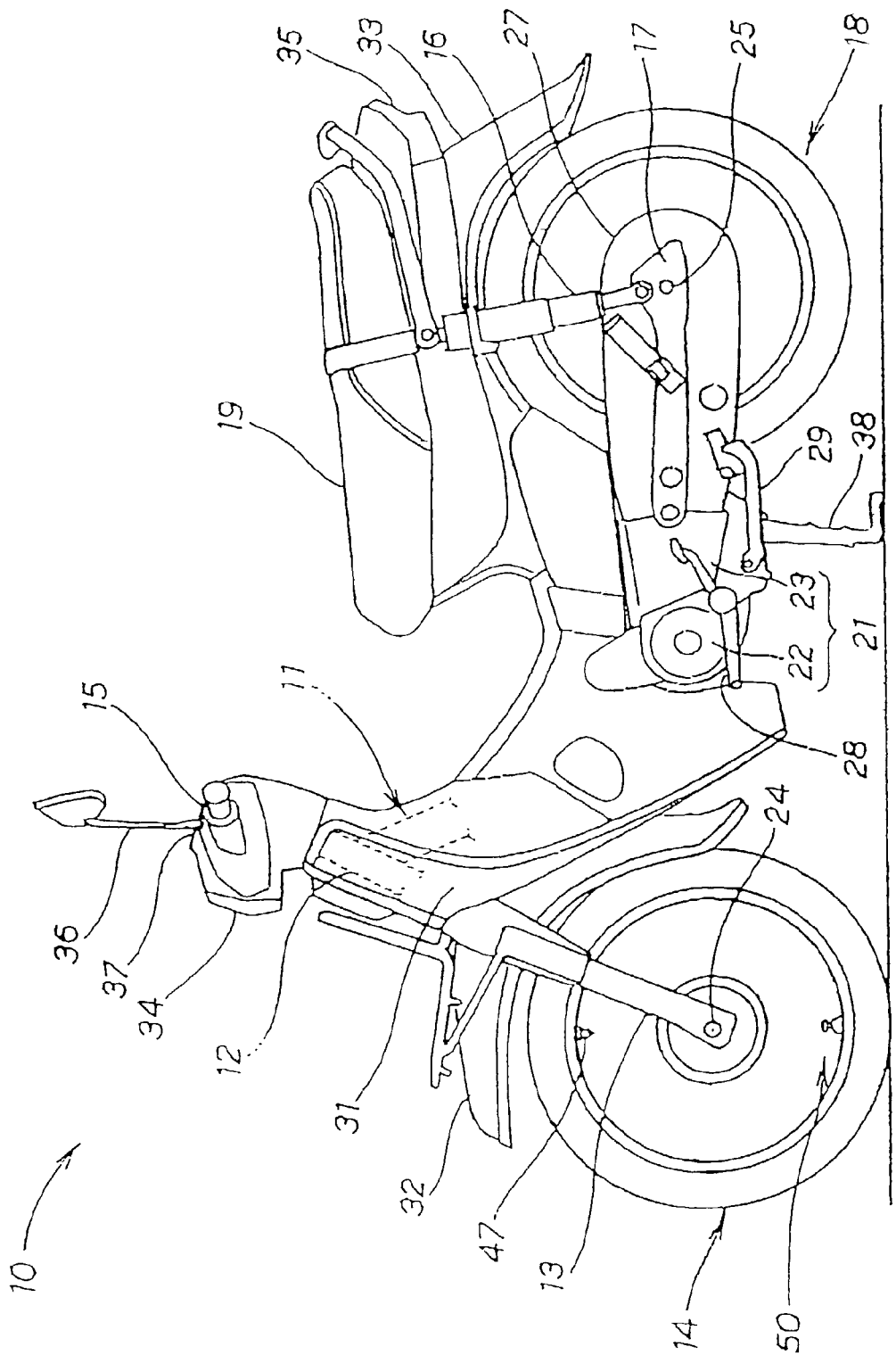
FIG. 1 is a side view of a motorcycle provided with a tire pressure detecting system according to the present invention mounted thereon.

As shown in FIG. 1, a motorcycle 10 includes a vehicle body frame 11 extending toward the lower rear portion of the vehicle with a head pipe 12 mounted on the vehicle body frame 11. A front fork 13 is mounted on the head pipe 12, a front wheel 14 mounted on the front fork 13 and a steering handle 15 is connected to the front fork 13. A rear shock absorber 16 is mounted at one end to the upper rear portion of the vehicle body frame 11. A swing arm 17 is mounted between the other end of the rear shock absorber 16 and the lower rear portion of the vehicle body frame 11 so as to be capable of a swinging motion with a rear wheel 18 mounted at the extremity of the swing arm 17. A seat 19 is disposed on the rear portion of the vehicle body frame 11. A power unit 21 including an engine 22 is disposed downwardly of the vehicle body frame 11 and a power transmission 23.

FIG. 1 illustrates axles 24, 25, with a drive chain cover 27 and a brake pedal 28. A kick pedal 29 is provided along with a leg shield 31, a front fender 32, a rear fender 33, a head lamp 34, a tail lamp 35, a back mirror 36, a meter panel 37 and a stand 38.

A tire pressure detecting system 50 will be described later, the tire pressure detecting system 50 is a system for detecting the tire pressure and enabling the driver to recognize the tire pressure even when the vehicle is moving.

Figure 2:
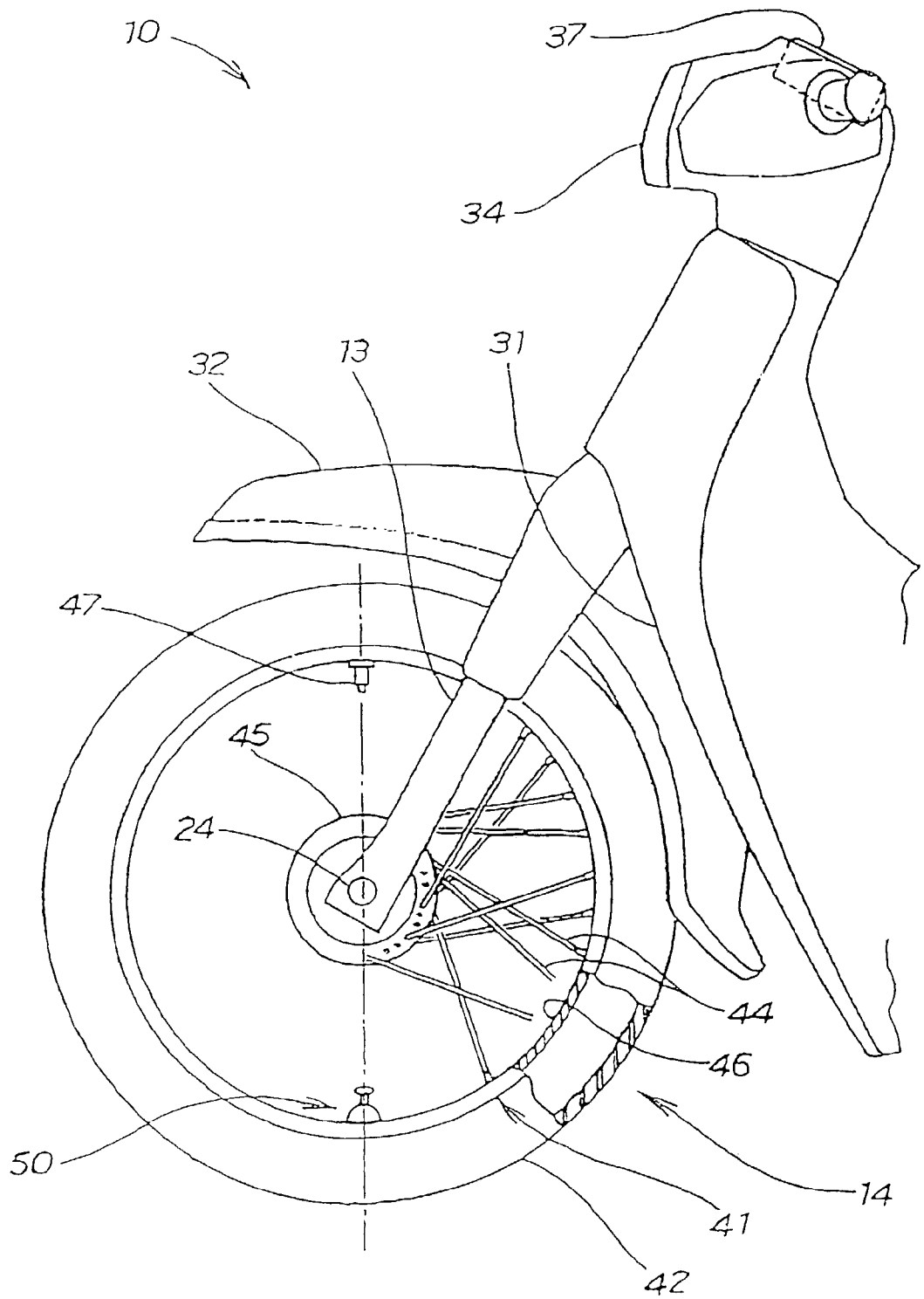
FIG. 2 is a side view around the front of the motorcycle provided with the tire pressure detecting system according to the present invention mounted thereon.

As shown in FIG. 2, the front wheel 14 includes a wheel 41, a tire 42 mounted on the wheel 41, and a tire pressure detecting system 50 for obtaining the air pressure of the tire 42.

The wheel 41 includes a wheel hub 45, a wheel rim 46, and a plurality of spokes 44. . . for connecting the wheel hub 45 and the wheel rim 46 (. . . hereinafter represents that there are a plurality of units of the same components). An air valve 47 is mounted on the wheel rim 46.

A rear wheel 18, as shown in FIG. 1, is a member of almost the same construction as the front wheel 14, and thus a detailed description will not be made.

Figure 3:
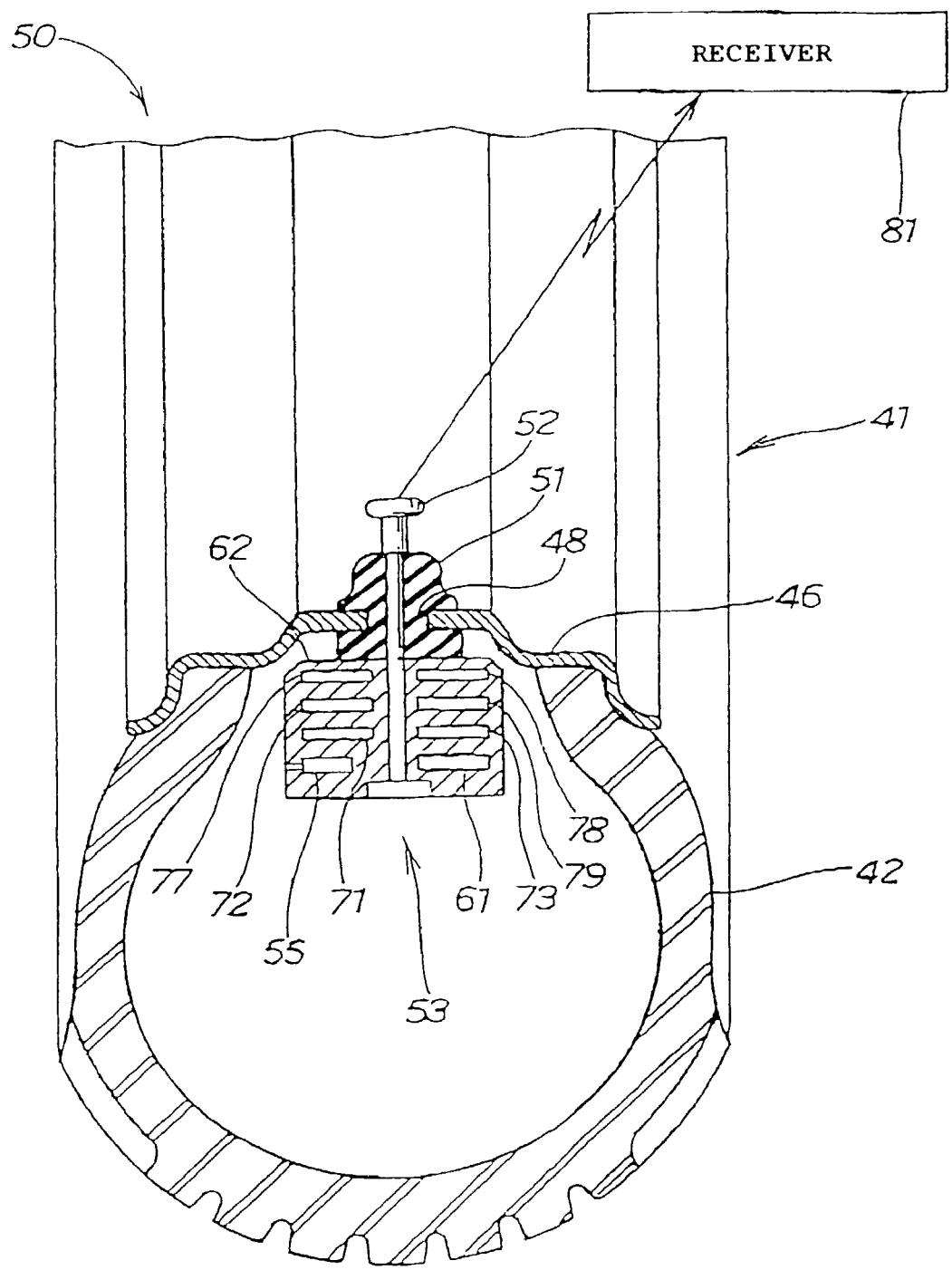
FIG. 3 is a front cross section of the tire pressure detecting system according to a first embodiment of the present invention.

As shown in FIG. 3, the tire pressure detecting system 50 is constructed in such a manner that an opening 48 is formed on the wheel rim 46 with a grommet 51 formed of rubber is fitted into the opening 48. A cored bar 52 is inserted into the grommet 51. A transmitter 53 for detecting the air pressure of the tire 42 and transmitting pressure information to the outside is held by the grommet 51 and is provided with a receiver 81 for issuing a warning based on pressure information from the transmitter 53.

The transmitter 53 includes an air pressure sensor 55 to be disposed in the tire 42 for detecting the air pressure in the tire 42 with a fluctuation calculating unit 71 for calculating fluctuations of the tire pressure per unit time detected by the air pressure sensor 55 and a fluctuation determination unit 72 for determining whether or not a warning is necessary, caution is necessary, or it is normal, based on fluctuations per unit time calculated by the fluctuation calculating unit 71. A fluctuation warning unit 73 is provided for issuing pressure information to the receiver 81 based on the result of the fluctuation determination unit 72. An air pressure determination unit 77 is provided for determining whether or not a warning is necessary, a caution is necessary, or it is normal based on the tire pressure detected by the air pressure sensor 55. A detected value warning unit 78 is provided for issuing pressure information to the receiver based on the result of the air pressure determination unit 77. A transmission interval varying unit 79 is provided for varying a transmission interval based on signals indicating warning and caution, and on signals indicating that it is normal supplied from the detected value warning unit 78 and the fluctuation determination unit 72.

Employing a grommet of an embedded type as the grommet 51 contributes to improve mountability to the wheel rim 46 and sealing capability. The cored bar 52 has a function as an antenna for receiving pressure information from the fluctuation warning unit 73 and the detected value warning unit 78 to transmit to the receiver 81 as well as a function to hold the transmitter 53. The receiver 81 is a unit provided on a meter panel 37 (See FIG. 4) as will be described later.

In FIG. 3, a battery 61 is provided for driving the transmitter 53. A case 62 is provided for storing the air pressure sensor 55, a battery 61, a fluctuation calculating unit 71, the fluctuation determination unit 72, the fluctuation warning unit 73, the air pressure determination unit 77, the detected value warning unit 78, and the transmission interval varying unit 79 altogether therein.

Figure 4:
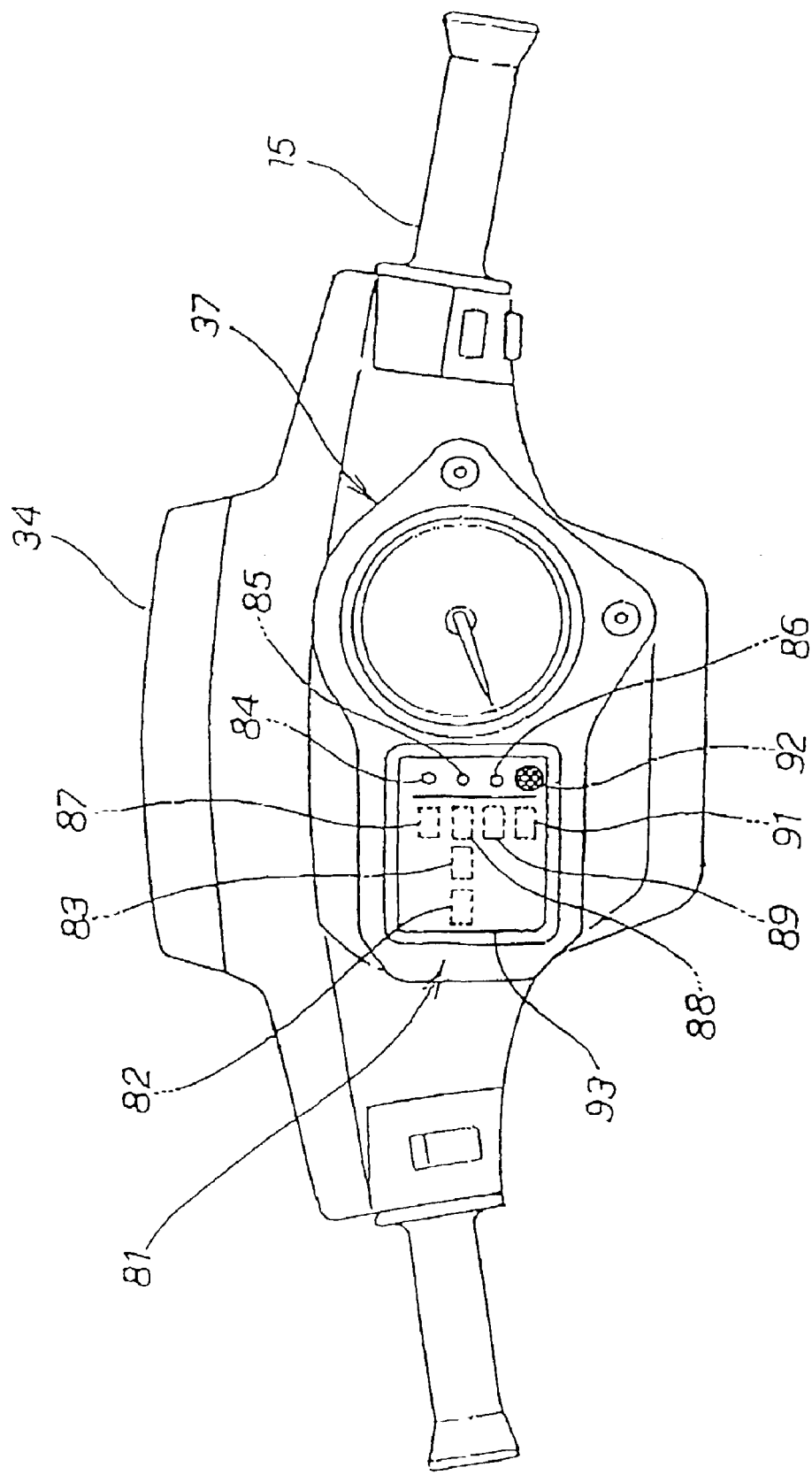
FIG. 4 is a plan view of a meter panel accommodating a receiver of the tire pressure detecting system according to the first embodiment of the present invention.

As shown in FIG. 4, the receiver 81, provided on the meter panel 37, includes a receiving circuit 82 for receiving pressure information transmitted from the transmitter 53 shown in FIG. 3, an information determination unit 83 for determining pressure information received by the receiving circuit 82, a first lighting circuit 87 for lighting a first light-emitting diode 84 when pressure information received by the information determination unit 83 is a warning signal, a second lighting circuit 88 for lighting a second light-emitting diode 85 when pressure information determined by the information determination unit 83 is a caution signal, a third lighting circuit 89 for lighting a third light-emitting diode 86 when pressure information determined by the information determination unit 83 is a signal indicating that pressure information is normal, and a buzzer driving circuit 92 for ringing a buzzer 91 when pressure information determined by the information determination unit 83 is a warning signal or a caution signal.

The first light-emitting diode 84 is a diode emitting red light, the second light-emitting diode 85 is a diode emitting yellow light, and the third light-emitting diode 86 is a diode emitting green light.

A housing 93 is provided for storing the receiving circuit 82, the information determination unit 83, the first to third light-emitting diodes, the first to third lighting circuits 87–89, the buzzer 91, and the buzzer driving circuit 92 altogether therein.

Figure 5:
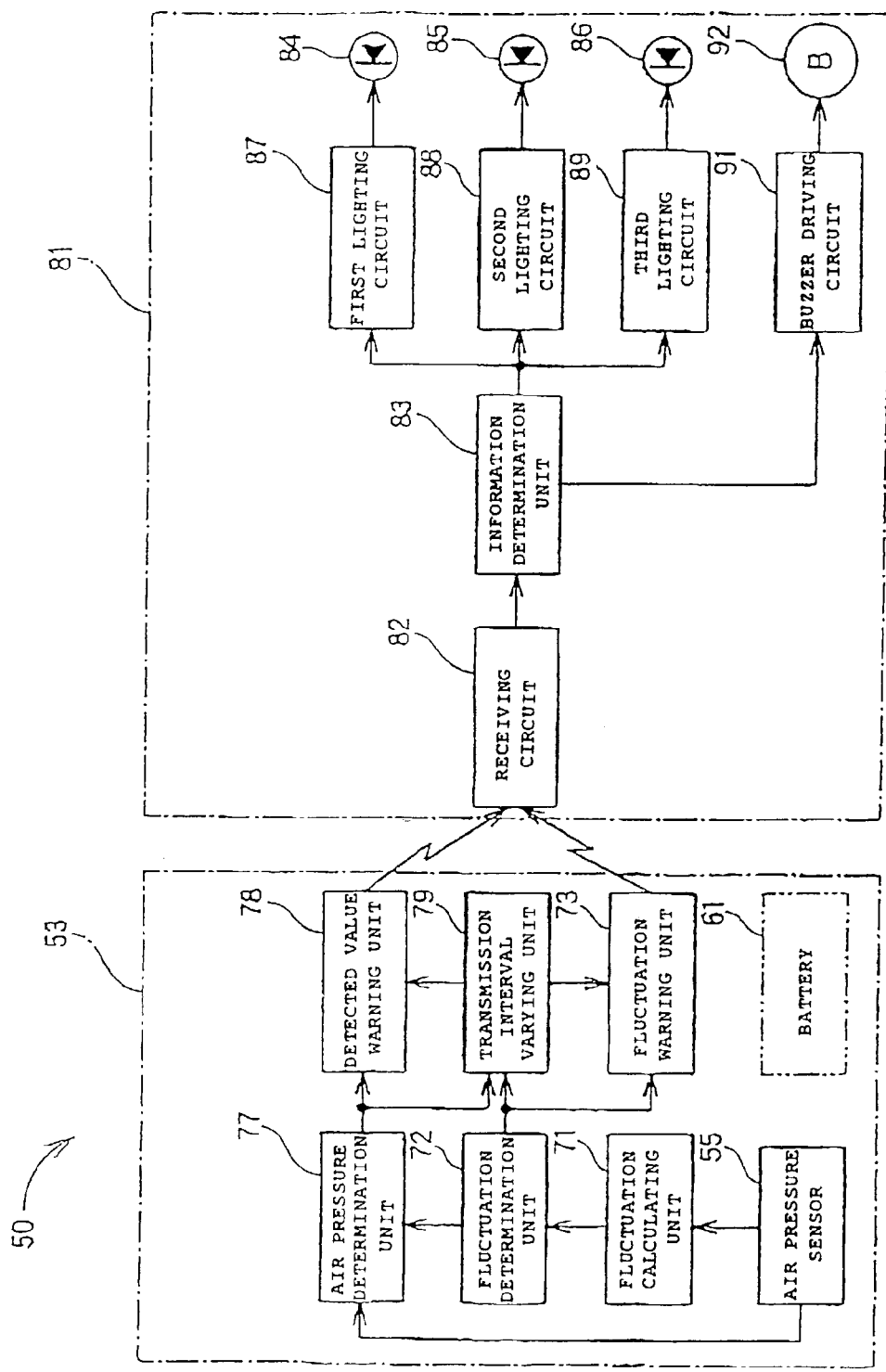
FIG. 5 is a block diagram of the tire pressure detecting system according to the first embodiment of the present invention.

As shown in FIG. 5, the tire pressure detecting system 50 wherein a tire pressure is detected by the air pressure sensor 55 and the detected tire pressure may be recognized, includes the fluctuation warning unit 73 for issuing a warning when fluctuations of the tire pressure per unit time exceed the predetermined threshold fluctuation, and the detected value warning unit 78 for issuing a warning when the detected value of the tire pressure has fallen to a value below the predetermined threshold detected value.

It is preferable if the occurrence of air leakage in the tire can be recognized before the tire pressure has fallen to a value below the predetermined value when the vehicle is moving.

Therefore, the fluctuation warning unit 73 issues a warning when fluctuations of the tire pressure per unit time exceed a predetermined threshold fluctuation so that the occurrence of air leakage may be quickly recognized. As a consequence, a countermeasure may be taken at the timing where variation of the tire pressure is small.

In addition, by providing the detected value warning unit 78 for issuing a warning when the detected value of the tire pressure has fallen to a value below the predetermined threshold detected value, abnormalities of air pressure may be recognized even when a faint air leakage occurs that produces fluctuations of the tire pressure per unit time that do not exceed the predetermined threshold fluctuation. As a consequence, the convenience of the tire pressure management for the driver may be improved.

The operation of the tire pressure detecting system 50 described above will be explained below.

Figure 6:
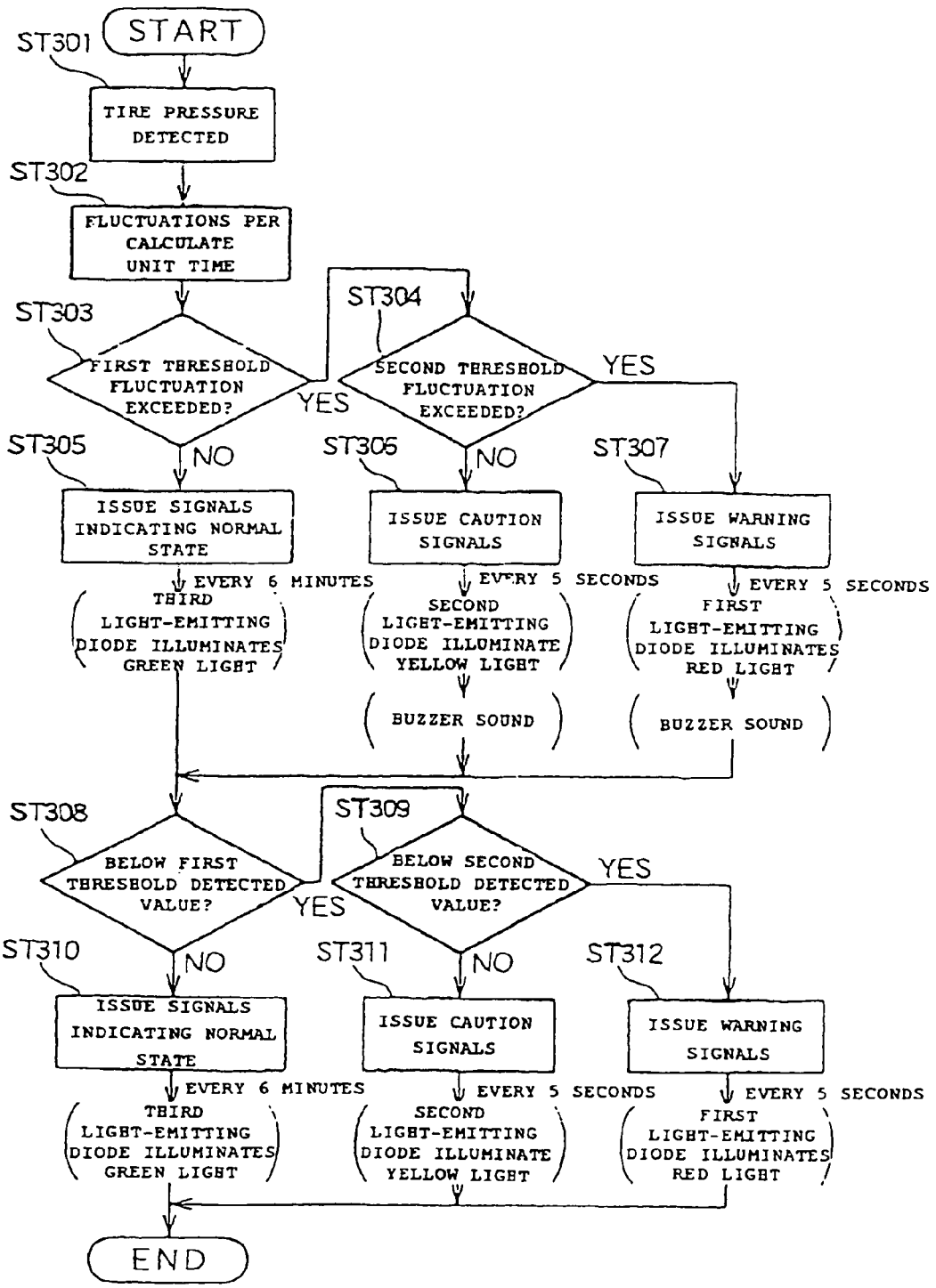
FIG. 6 is a flow chart of the tire pressure detecting system according to the first embodiment of the present invention.

FIG. 6 is a flow chart of the tire pressure detecting system (See FIG. 5 as for reference numerals). In the FIG. 6, the reference sign and numeral STxxx represents step Numbers.

ST301: the tire pressure is detected by the air pressure sensor 55.

The relation of P×V/T=(constant) is satisfied where P is a tire pressure, V is a tire volume, and T is a tire air temperature. Here, P represents an absolute pressure, and T represents an absolute temperature.

ST302: Fluctuations Pv (corresponding to the reduced tire pressure) per unit time is calculated by the fluctuation calculating unit 71.

ST303: Whether or not fluctuations Pv per time unit exceed a first threshold fluctuation Pv1 as a threshold fluctuation (Pv>Pv1) is determined. If YES, the procedure goes to ST305, and if NO, the procedure goes to ST304.

ST304: Whether or not fluctuations Pv per unit time exceeds the second threshold fluctuation Pv2 as a threshold fluctuation (Pv>Pv2) is determined. If NO, the procedure goes to ST306, and if YES the procedure goes to ST307.

ST305: Signals indicating that fluctuations Pv of the tire pressure is normal are transmitted every six minutes from the fluctuation warning unit 73. As a consequence, the third light emitting diode 86 emits green light.

ST306: Caution signals are transmitted every five seconds from the fluctuation warning unit 73. As a consequence, the second light emitting diode 85 emits yellow light and the buzzer 91 rings.

ST307: Warning signals are transmitted every five seconds from the fluctuation warning unit 73. As a consequence, the first light emitting diode 84 emits red light and the buzzer 91 rings.

ST308: Whether or not the tire pressure Pk has fallen to a value below the first threshold detected value Pk1 as a threshold detected value (Pk<Pk1) is determined. If NO, the procedure goes to ST310, and if YES, the procedure goes to ST309.

ST309: Whether or not the tire pressure Pk has fallen to a value below the second threshold detected value Pk2 as a threshold detected value (Pk<Pk2) is determined. If NO, the procedure goes to ST311, and if YES, the procedure goes to ST312.

ST310: Signals indicating that the tire pressure Pv is normal is transmitted every 6 minutes from the detected value warning unit 78. As a consequence, the third light-emitting diode 86 emits green light.

ST311: Caution signals are transmitted every 5 seconds from the detected value warning unit 78. As a consequence, the second light-emitting diode 85 emits yellow light.

ST312: Warning signals are transmitted every 5 seconds from the detected value warning unit 78. As a consequence, the first light-emitting diode 84 emits red light.

The fluctuation warning unit 73 is a unit for detecting fluctuations Pv of the tire pressure per unit time and transmitting a warning, which is especially effective for finding an unpredictable air leakage. The detected value warning unit 78 is a unit for detecting the tire pressure Pk and transmitting a warning, and is especially effective for finding air leakage that cannot be detected during gentle variation of tire pressure per unit time.

Therefore, the unpredictable air leakage that is high in a degree of urgency may be rapidly detected by taking priority to processing by the fluctuation warning unit 73 that can find the unpredictable air leakage over processing by the detected value warning unit 78.

Figure 7A:
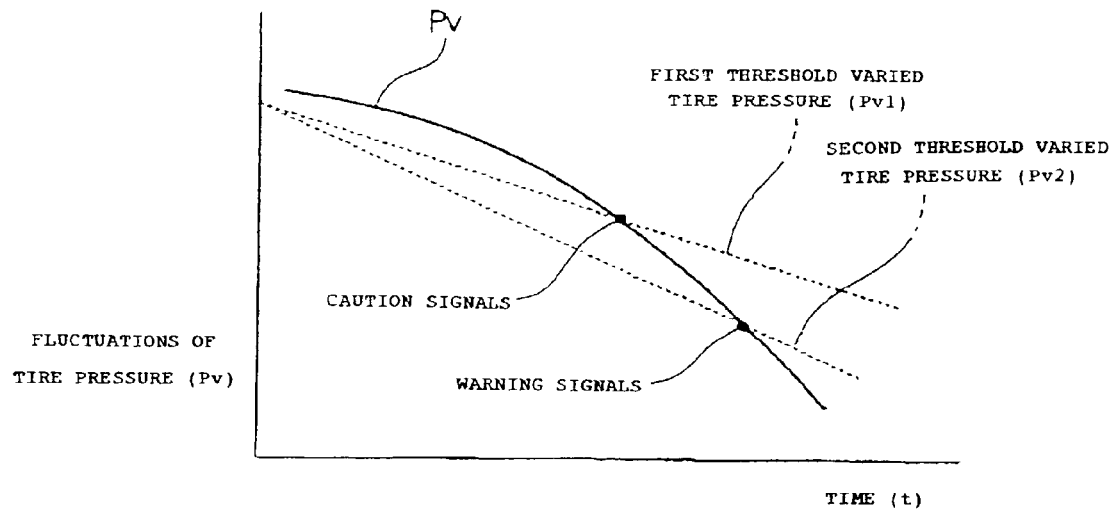
FIG. 7A is a graph of characteristics of the tire pressure detecting system according to the present invention, showing a warning supplied from a fluctuation warning unit.

As shown in FIG. 7a, the fluctuation warning unit 73 sets two curves representing threshold fluctuations in order to detect fluctuations Pv of the tire pressure per unit time. In other words, the curve representing the first threshold fluctuation Pv1 which is gentle in inclination, and the curve representing the second threshold fluctuation Pv2, which is steeper than the curve representing the first threshold fluctuation Pv1 are set.

The graph shows that caution signals are issued when fluctuations Pv per unit time exceed the curve representing the first threshold fluctuation Pv1, and warning signals are issued when fluctuations Pv per unit time exceed the curve representing the second threshold fluctuation Pv2.

Figure 7B:
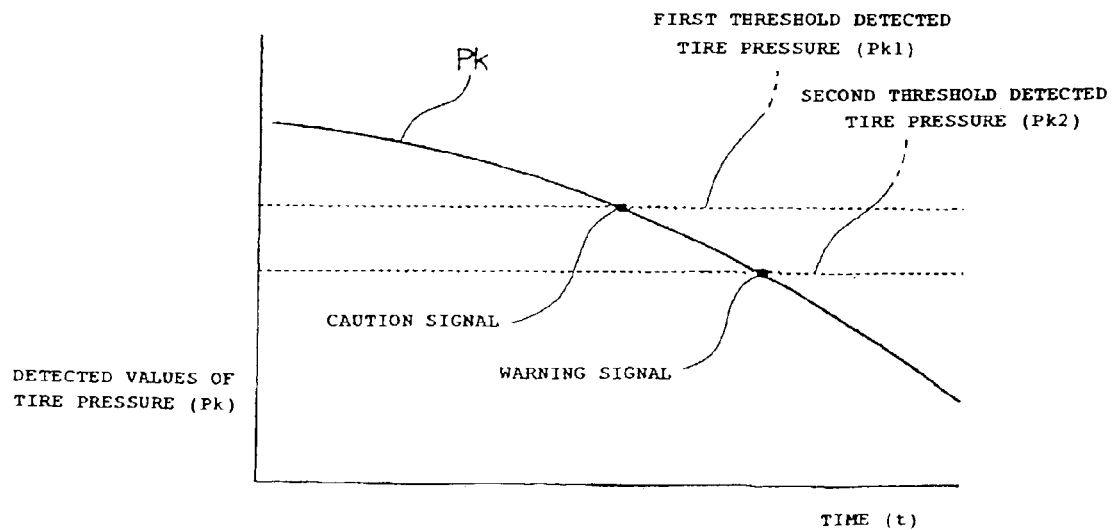
FIG. 7B is a graph of characteristics of the tire pressure detecting system according to the present invention, showing a warning supplied from a fluctuation warning unit.

As shown in FIG. 7b, the detected value warning unit 78 sets two curves representing thresholds of detected value in order to detect the tire pressure Pk. In other words, the first threshold detected value Pk1 and the second threshold detected value Pk2, which is lower in the air pressure than the first threshold detected value Pk1 are set.

The graph shows that caution signals are issued when the tire pressure Pk has fallen to a value below the first threshold detected value Pk1, and warning signals are issued when the pressure has fallen to the value below the second threshold detected value Pk2.

As shown in FIG. 1, though the vehicle in the first embodiment is described as a motorcycle 10 in the first embodiment, it is not limited to a two-wheeler. Alternatively, the vehicle may be a four-wheeler or a three-wheeler.

As shown in FIG. 4, although the receiver 81 is provided on the meter panel 37 in the first embodiment, it is not limited thereto. For example, if the receiver 81 is a type that issues a warning, the receiver 81 may be provided on the vehicle body frame or a helmet, and if the receiver 81 is a type using vibrations, it may be provided on a seat or on the helmet. The receiver 81 is described as a unit to be mounted on the front wheel 14 (See FIG. 1), it may be a unit for receiving information from the rear wheel 18.

In the first embodiment, as shown in FIG. 5, the fluctuation warning unit 73 and the detected value warning unit 78 are provided on the side of the transmitter 53 in the first embodiment. However, it is not limited thereto, and, for example, it is also applicable that a communicator for issuing information on the tire pressure is provided on the side of the transmitter side. In addition, the receiver is provided for receiving information on the tire pressure from the communicator, and the receiver processes the fluctuation warning.

A tire pressure detecting system 150 according to the second embodiment will be described below. The same parts as those used in the tire pressure detecting system 150 in the first embodiment are represented by the same reference numerals and they are not described in detail again.

Figure 8:
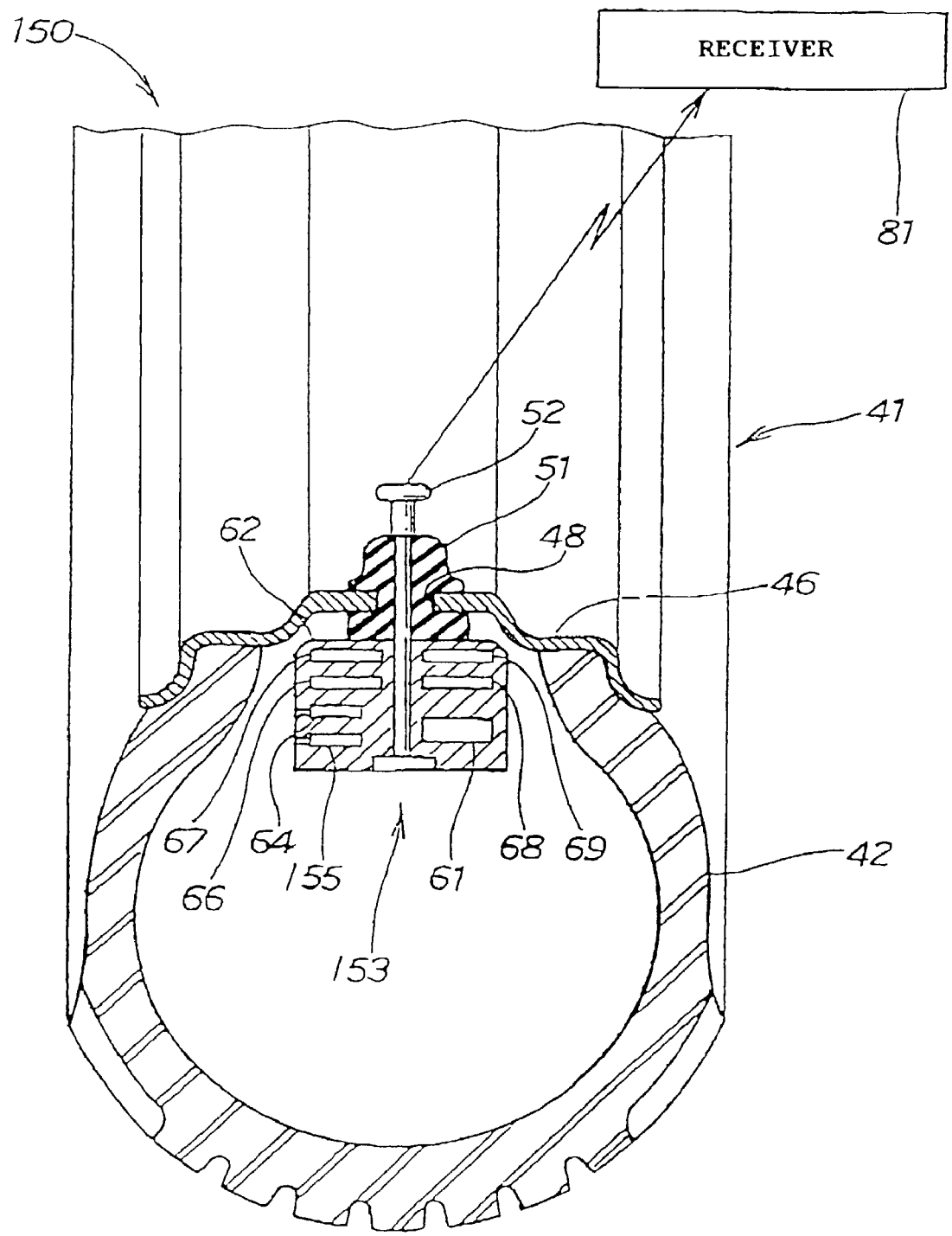
FIG. 8 is a front cross section of the tire pressure detecting system according to a second embodiment of the present invention.

As shown in FIG. 8, the tire pressure detecting system 150 is constructed in such a manner that an opening 48 is formed on the wheel rim 4. A grommet 51 formed of rubber is fitted into the opening 48 with a cored bar 52 inserted into the grommet 51. A transmitter 153 is provided for detecting the air pressure of the tire 42 and transmitting pressure information to the outside. The transmitter 153 is held by the grommet 51 and is provided with a receiver 81 for issuing a warning based on pressure information from the transmitter 153.

The transmitter 153 includes an air pressure sensor 155 disposed in the tire 42 for detecting the air pressure in the tire, a temperature sensor 64 for detecting the air temperature in the tire 42, a pressure converting unit 66 for converting the tire pressure detected by the air pressure sensor 64 into a pressure at a predetermined temperature based on the air temperature detected by the temperature sensor 155, an air pressure determination unit 67 for determining whether a warning is necessary, caution is necessary or it is normal, based on the air pressure converted into the pressure under a reference atmospheric pressure by the pressure converting unit 66, a transmission circuit 68 for transmitting warning signals, caution signals, or signals indicating that the air pressure is normal as pressure information based on the result determined by the air pressure determination unit 67, and a transmission interval varying unit 69 for varying the transmission interval of the transmission circuit 68 by the warning signals, the caution signals, and the signals indicating that the air pressure is normal.

By employing an embedded type as the grommet 51, mountability to the wheel rim 46 and sealing capability may be improved. The cored bar 52 is provided with a function as an antenna for transmitting pressure information from the transmission circuit 68 to the receiver 81 in addition to a function to hold the transmitter 153. The receiver 81 is a unit provided on a meter panel 37 (See FIG. 4) as will be described later.

In FIG. 8, a battery 61 is provided for driving the transmitter 153. A case 62 is provided for storing a battery 61, the temperature sensor 64, the pressure converting unit 66, the air pressure determination unit 67, the transmission circuit 68, and the transmission interval varying unit 69 together.

Figure 9:
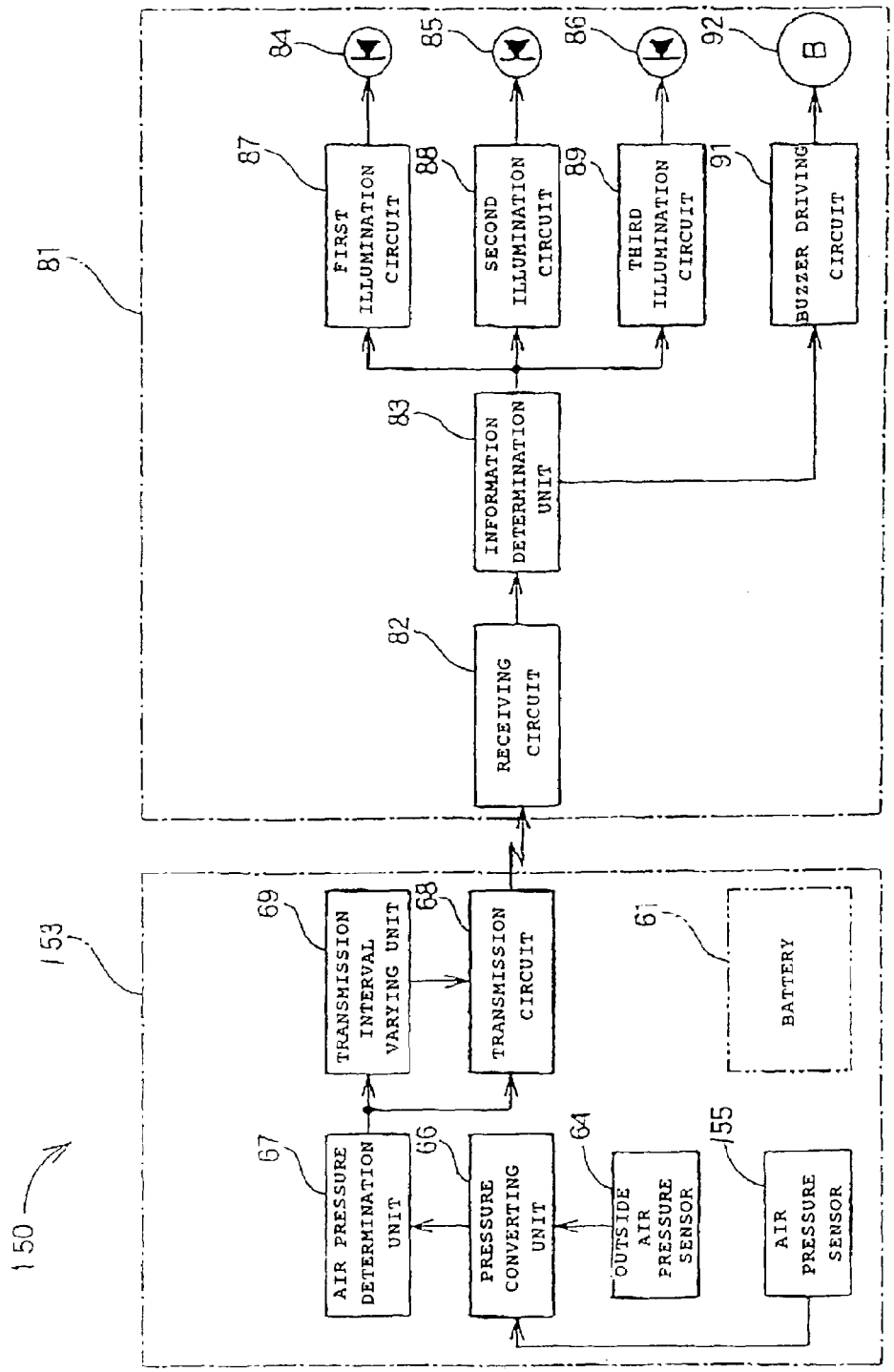
FIG. 9 is a block diagram of the tire pressure detecting system according to the second embodiment of the present invention.

As shown in FIG. 9, the tire pressure detecting system 150 is provided wherein the tire pressure is detected by the air pressure sensor 155 disposed on the side of the front wheel 14 (wheel) shown in FIG. 1 and detected information on the tire pressure is transmitted from the transmitter 153 disposed on the side of the front wheel 14 (wheel) to the receiver 81 disposed on the side of the vehicle body frame 11 (vehicle body) shown in FIG. 1. A warning is issued when the received tire pressure is outside the predetermined value. The transmitter 153 is provided with a temperature sensor 64 for detecting the air temperature in the tire 42 (See FIG. 8). The pressure converting unit 66 is provided for converting the tire pressure detected by the air pressure sensor 155 into a pressure at the predetermined temperature based on the air temperature detected by the temperature sensor. A transmission interval varying unit 69 is provided for shortening the interval of transmission to the receiver 81 when the converted pressure supplied from the pressure converting unit 66 has fallen to a value below the predetermined threshold pressure.

When detecting the tire pressure and notifying the detected tire pressure to the driver, it is preferable to be capable of perform this process accurately and quickly even when the vehicle is moving.

Therefore, the temperature sensor 64 for detecting the air temperature in the tire 42 (See FIG. 8), and the pressure converting unit 66 for converting the tire pressure detected by the air pressure sensor 155 into a pressure at the predetermined temperature based on the air temperature detected by the temperature sensor 64 are provided in the transmitter 153 so that a temperature correction is made to the air pressure of the tire 42 to be detected. As a consequence, when air leakage occurres, such air leakage may be accurately detected by removing the false tire pressure-maintaining phenomenon caused by an increase in tire pressure due to an increase in temperature.

In addition, since the transmitter 153 includes the transmission interval varying unit 69 for shortening the interval of transmission to the receiver 81 when the converted pressure from the pressure converting unit 66 has fallen to a value below the predetermined threshold pressure, abrupt air leakage or the like may be notified. As a consequence, the convenience of tire pressure management for the driver may be improved.

Normally, setting the interval of transmission to the receiver 81 elongates the life of the battery 61.

The operation of the tire pressure detecting system 150 described thus far will be described below.

Figure 10:
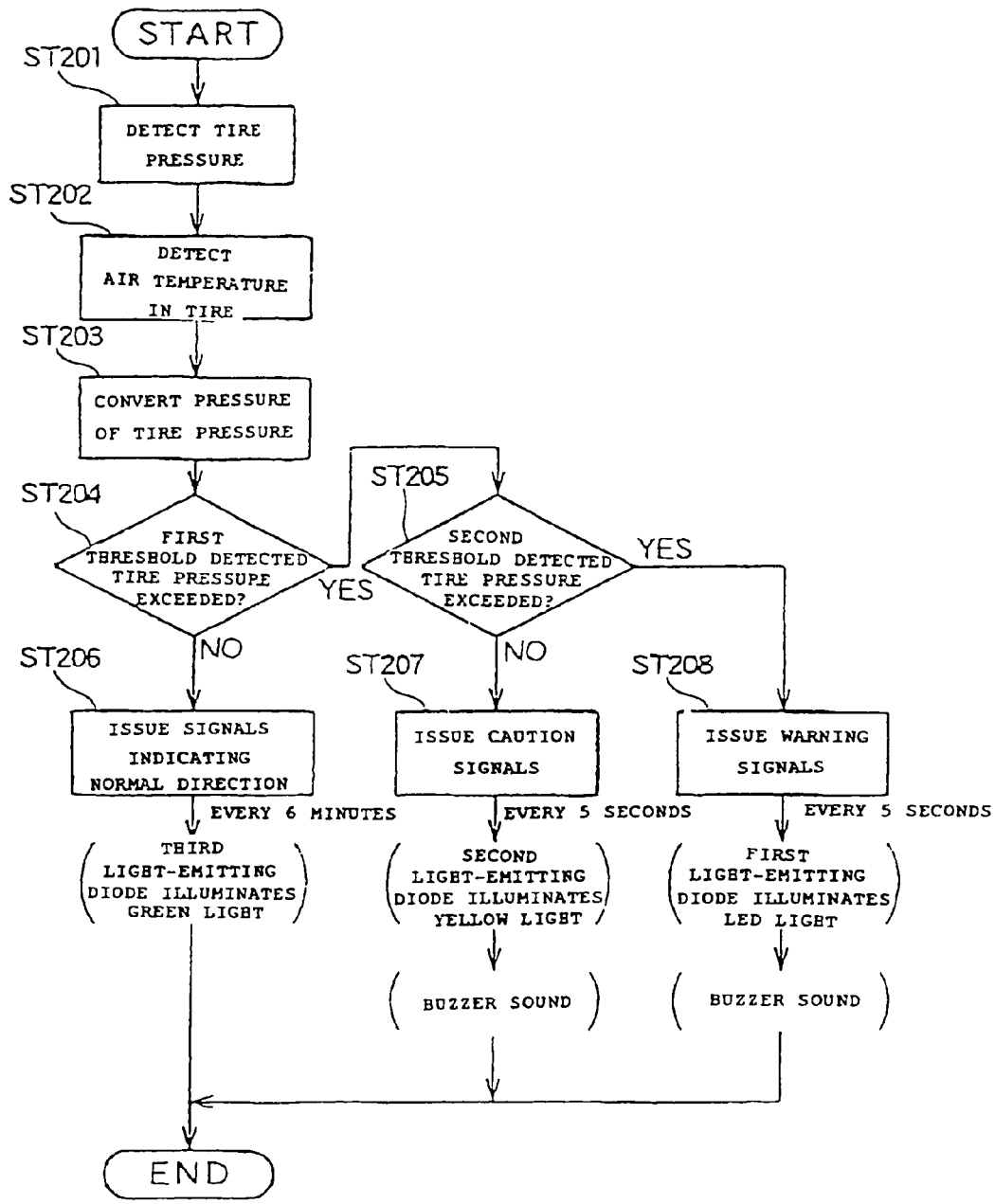
FIG. 10 is a flow chart of the tire pressure detecting system according to the second embodiment of the present invention.

FIG. 10 is a flow chart of the tire pressure detecting system (See FIG. 9 as for reference numerals). In FIG. 10, the reference sign and numeral STxxx represents step numbers.

ST201: the tire pressure is detected by the air pressure sensor 155.

ST202: the air temperature in the tire 42 (See FIG. 8) is detected by the temperature sensor 64.

ST203: the detected tire pressure is converted (temperature correction) into the tire pressure at the predetermined temperature. Here, the predetermined temperature is assumed to be 20° C.

Generally, the relation $P \times V/T =$ (constant) is satisfied, where P represents tire pressures, V represents tire volumes, and T represents air temperatures in the tire. Here, P represents an absolute pressure, and T represents an absolute temperature.

For example, assuming that the tire volume V is constant, it is inferred that the tire pressure P increases when the air temperature T in the tire increases, and decreases when the temperature T in the tire decreases.

Therefore, the tire pressure is converted at the predetermined temperature of 20° C.

ST204: Whether or not the tire pressure Pk exceeds a first threshold detected pressure Pk1 is determined, where Pk represents the converted tire pressures, and Pk1 represents the first threshold detected value as a predetermined threshold pressure (Pk>pk1). If YES, the procedure goes to ST206, and if NO, the procedure goes to ST205.

ST205: Whether or not the tire pressure Pk exceeds the second threshold detected tire pressure Pk2 is determined, where Pk2 is the second threshold detected tire pressure Pk2 as a value predetermined under certain conditions (Pk>Pk2). If YES, the procedure goes to ST207, and if NO, the procedure goes to ST 208.

ST206: Signals indicating that the tire pressure Pk is normal are issued every 6 minutes. As a consequence, the third light emitting diode 86 emits green light.

ST207: Caution signals are issued every 5 seconds. As a consequence, the second light emitting diode 85 emits yellow light and the buzzer 91 rings.

ST208: Warning signals are issued every 5 seconds. As a consequence, the first light emitting diode 84 emits red light and the buzzer 91 rings.

Figure 11:
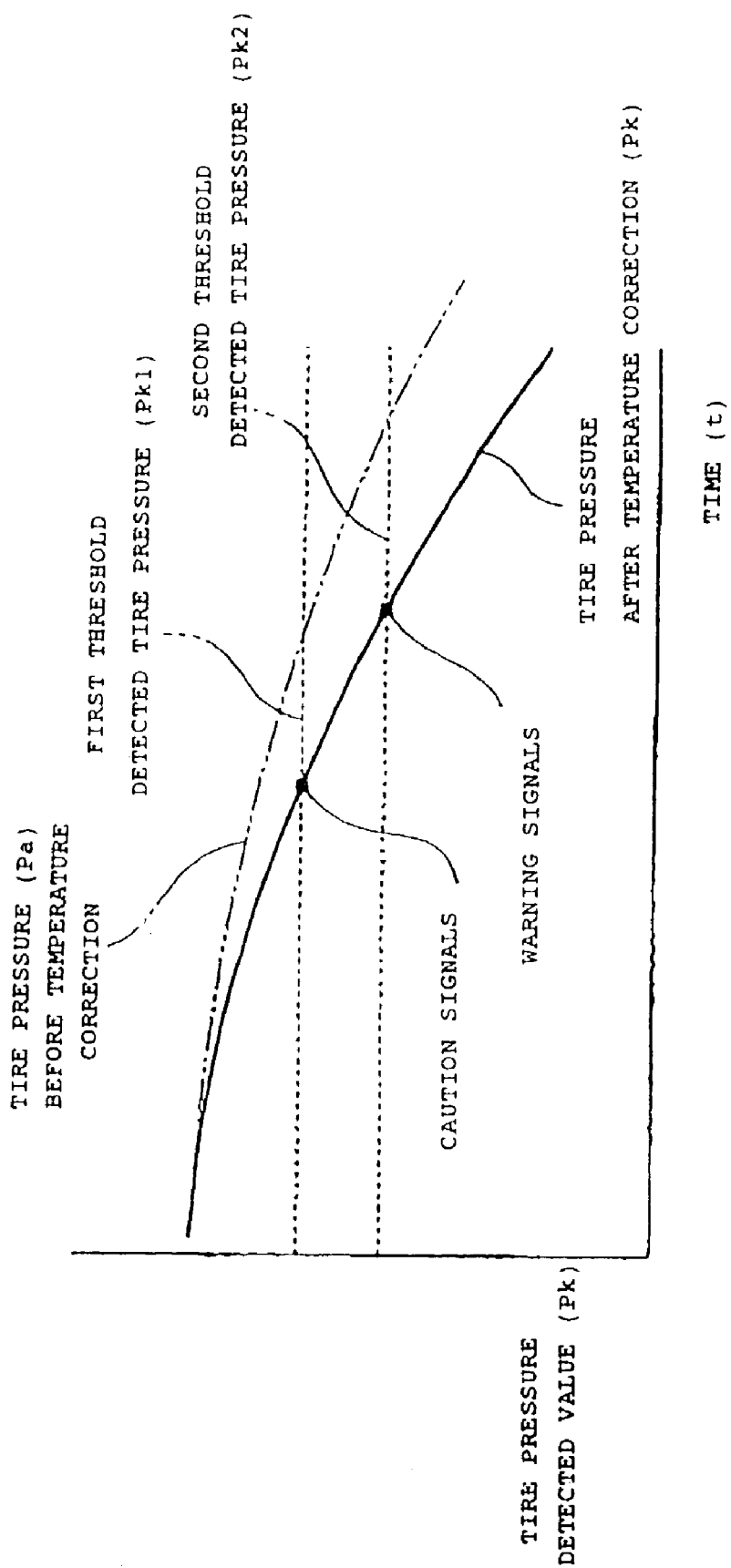
FIG. 11 is a graph of the characteristics of the tire pressure detecting system according to the second embodiment of the present invention.

In FIG. 11, reference sign Pk represents the tire pressure after the temperature is corrected (converted), and Pa represents the tire pressure before the temperature is not corrected.

In other words, if the temperature is not corrected, no significant variation can be recognized in the tire pressure because the tire pressure increases due to an increase in temperature when air leakage occurs, and thus air leakage or the like may be found too late.

Therefore, the transmitter 153 is provided with the temperature sensor 64 for detecting the air temperature in the tire 42 (See FIG. 8), and the pressure converting unit 66 for converting the tire pressure detected by the air pressure sensor 155 into a pressure at the predetermined temperature based on the air temperature detected by the temperature sensor 64 to make a temperature correction to the air pressure of the tire 42 to be detected. As a consequence, air leakage may be accurately detected by removing a false tire pressure-maintaining phenomenon caused by an increase in tire pressure due to an increase in temperature when air leakage occurs.

As shown in FIG. 1, though the vehicle in the second embodiment is described as a motorcycle 10, it is not limited to a two-wheeler. Alternatively, the vehicle may be a four-wheeler or a three-wheeler.

As shown in FIG. 4, although the receiver 81 is provided on the meter panel 37 in the second embodiment, it is not limited thereto. For example, if the receiver 81 is a type that issues a warning, it may be provided on the vehicle body frame or a helmet, and if the receiver 81 is a type using vibrations, it may be provided on a seat or on the helmet. The receiver 81 is described as a unit to be mounted on the front wheel 14 (See FIG. 1), it may be a unit for receiving information from the rear wheel 18.

In the second embodiment, as shown in FIG. 9, the pressure converting unit 66 is provided on the side of the transmitter 153. However, it is not limited thereto, and, for example, the pressure converting unit 66 may be adapted in such a manner that information on the air pressure and information on air temperature in the tire are issued to the receiver, so that it is processed in the receiver.

A tire pressure detecting system 250 according to the third embodiment will be described below. The same parts as those used in the tire pressure detecting system 250 in the first embodiment are represented by the same reference numerals and they are not described in detail again.

Figure 12:
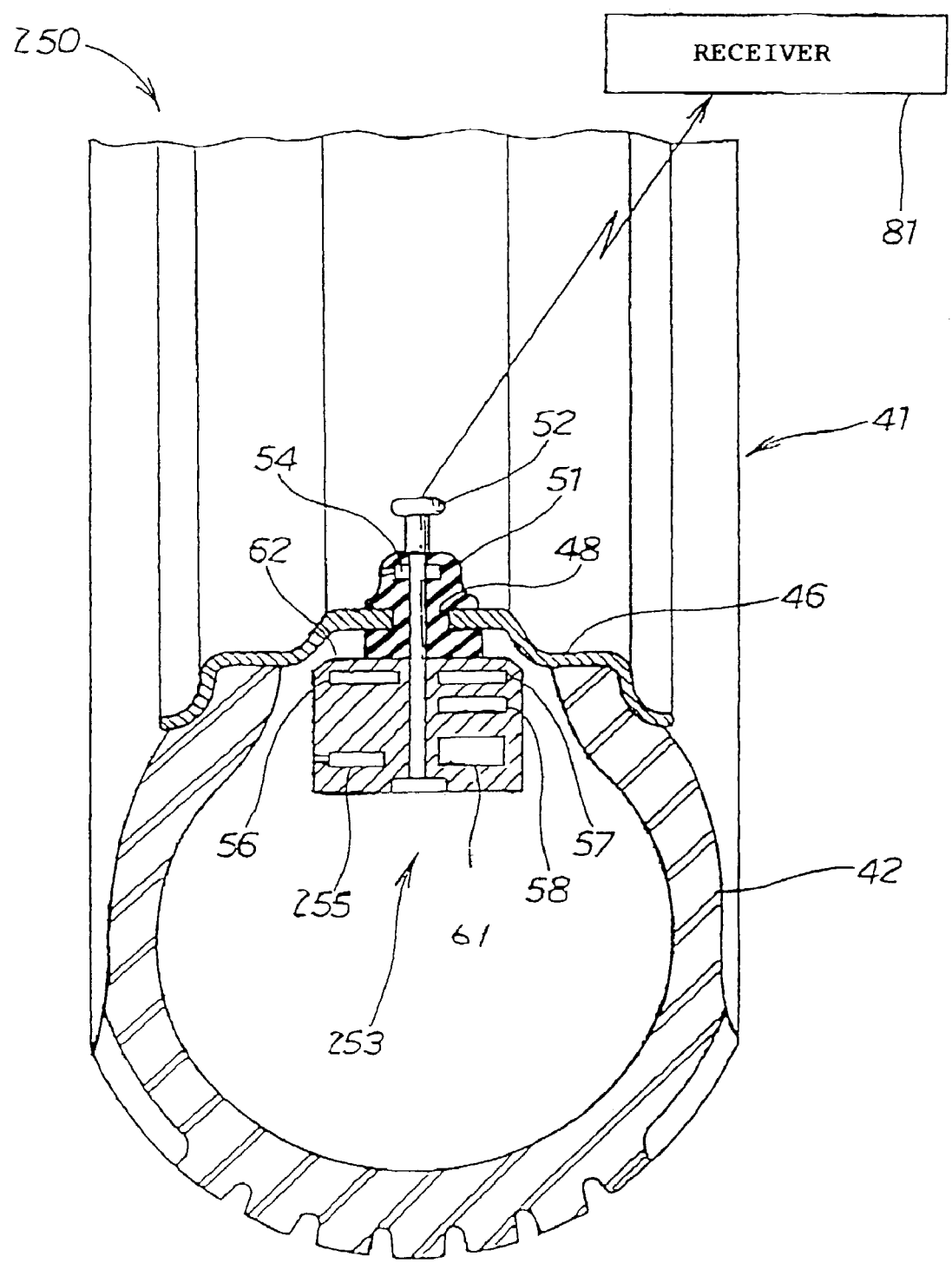
FIG. 12 is a front cross section of the tire pressure detecting system according to a third embodiment of the present invention.

As shown in FIG. 12, the tire pressure detecting system 250 is constructed in such a manner that an opening 48 is formed on the wheel rim 46, a grommet 51 formed of rubber is fitted into the opening 48, a cored bar 52 is inserted into the grommet 51, and a transmitter 253 for detecting the air pressure of the tire 42 and transmitting pressure information to the outside is held by the grommet 51, and is provided with a receiver 81 for issuing a warning based on pressure information supplied from the transmitter 253.

The transmitter 253 includes an ambient air pressure sensor 54 embedded in the grommet 51 on the inner side with respect to the wheel rim 46. An air pressure sensor 255 is disposed in the tire 42 for detecting the air pressure of the tire 42. A pressure converting unit 56 is provided for converting the tire pressure detected by the air pressure sensor 255 into a pressure under the reference atmospheric pressure based on the ambient pressure detected by the ambient air pressure sensor 54. An air pressure determination unit 57 is provided for determining whether a warning is necessary, caution is necessary, or it is normal based on the air pressure converted into the pressure under the reference atmospheric pressure by the pressure converting unit 56. A transmission circuit 58 is provided for transmitting warning signals, caution signals or signals indicating that the air pressure is normal as pressure information based on the result determined by the air pressure determination unit 57.

Employing a grommet of an embedded type as the grommet 51 contributes to improve mountability to the wheel rim 46 and sealing capability. The cored bar 52 is provided with a function as an antenna for transmitting pressure information from the transmission circuit 58 to the receiver 81 as well as a function to hold the transmitter 53. The receiver 81 is a unit provided with a meter panel 37 (See FIG. 4) as will be described later.

In FIG. 12, a battery 61 is provided for driving the transmitter 253. A case 62 is provided for storing the pressure converting unit 56, the air pressure determination unit 57, the transmission circuit 58, and a battery 61 altogether.

Figure 13:
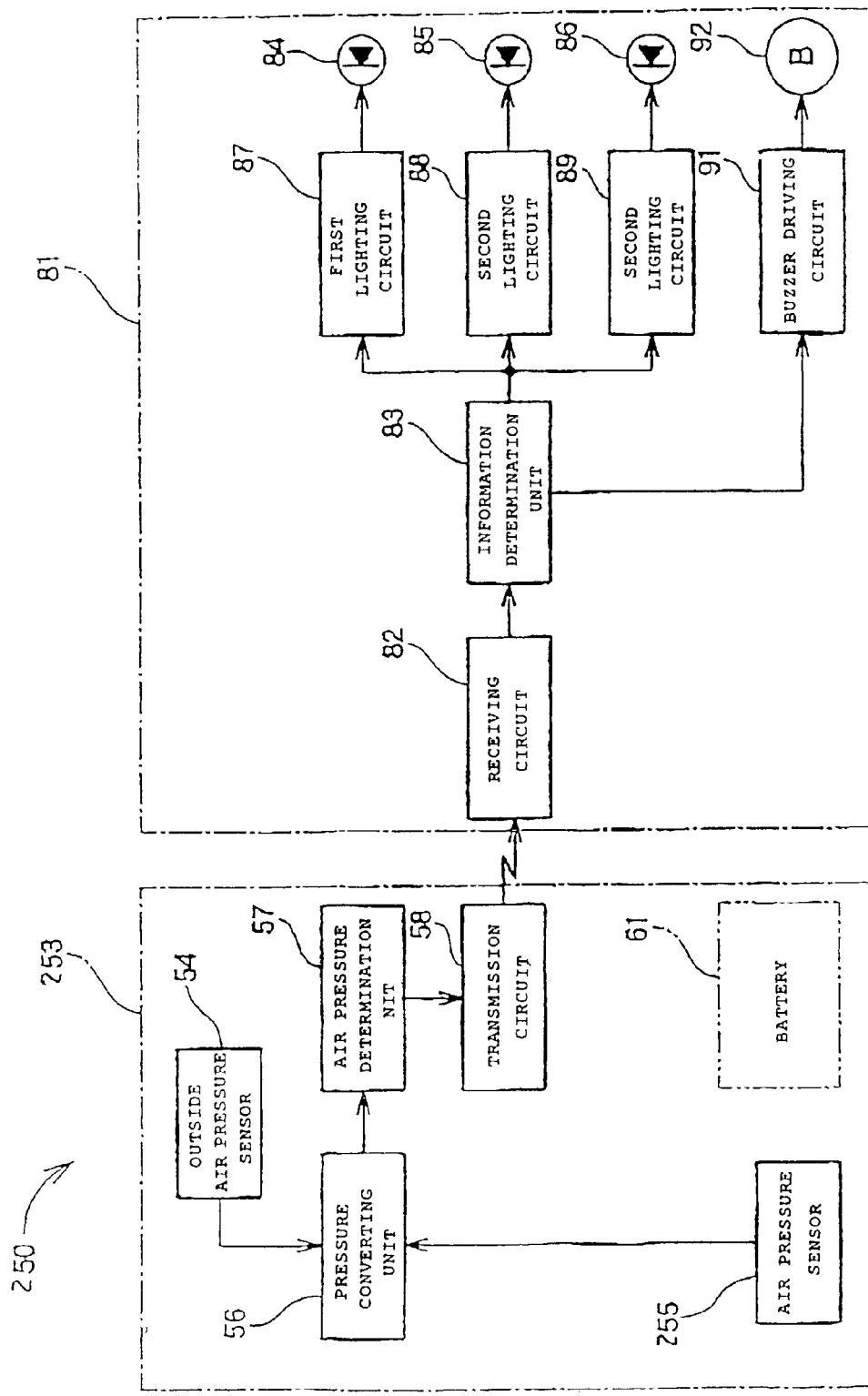
FIG. 13 is a block diagram of the tire pressure detecting system according to the third embodiment of the present invention.

As shown in FIG. 13, the tire pressure detecting system 250 is provided wherein the tire pressure is detected by the air pressure sensor 255, and a warning is issued when the tire pressure lies outside the predetermined value. The ambient air pressure sensor 54 is provided for detecting ambient air pressures, and a pressure converting unit 56 is provided for converting a tire pressure detected by the air pressure sensor 255 into a pressure under the reference atmospheric pressure based on the ambient air pressure detected by the ambient air pressure sensor 54.

In other words, it is preferable to detect the tire pressure and allow the driver to recognize the tire pressure even when the vehicle is moving, and, it is more preferable in this case to take variations in the tire pressure due to the influence of the ambient air pressure into consideration so that a warning is issued when the tire pressure lies outside the value predetermined under certain conditions regardless of whether it is at high altitudes or at a level ground.

Therefore, the tire pressure detecting system 50 is constructed in such a manner that the ambient air pressure is detected by the ambient air pressure sensor 54, and the tire pressure detected by the air pressure sensor 255 is converted into a pressure under the reference atmospheric pressure by the pressure converting unit 56 based on the ambient air pressure.

More specifically, if we assume that the ambient air pressure detected by ambient pressure sensor 54 is $P_{10}$ in an absolute pressure, and the tire pressure detected by the air pressure sensor 255 at this time is $p_{11}$ in a gauge pressure and the reference atmospheric pressure is $P_{12}$ in an absolutely pressure, the tire pressure $p_{13}$ after correction of the pressure may be expressed as follows:

$$p_{13}=(P_{10}+p_{11})-P_{12} \qquad (1)$$

For example, when a reference atmospheric pressure $P_{12}$ is 100 kPa, and a tire pressure $p_{11}$ measured at a high altitude where the ambient air pressure $P_{10}$ is 80 kPa is assumed to be 200 kPa, the following expression is satisfied based on the expression (1):

$$p_{13}=(80+200)-100=180 \ kPa \qquad (2)$$

When the tire pressure P11 measured at the level ground at which the ambient air pressure $P_{10}$ is 100 kPa is 180 kPa, from the expression (1), the following expression is satisfied:

$$p_{13}=(100+180)-100=180 \ kPa \qquad (3)$$

When the tire pressure $P_{11}$ measured at low altitudes such as a submarine tunnel, at which the ambient air pressure $P_{10}$ is 120 kPa, is 160 kPa, the following expression is satisfied based on the expression (1):

$$p_{13}=(120+160)-100=180 \ kPa \qquad (4)$$

As a consequence, a converted pressure of 180 kPa may be obtained regardless of the height from the ground in the example described above. Using such tire pressure after conversion, the system is adapted to issue a warning when the tire pressure lies outside the value predetermined under certain conditions. As a consequence, convenience of the tire pressure management for the driver may be improved.

The operation of the tire pressure detecting system 250 described above will be explained below.

Figure 14:
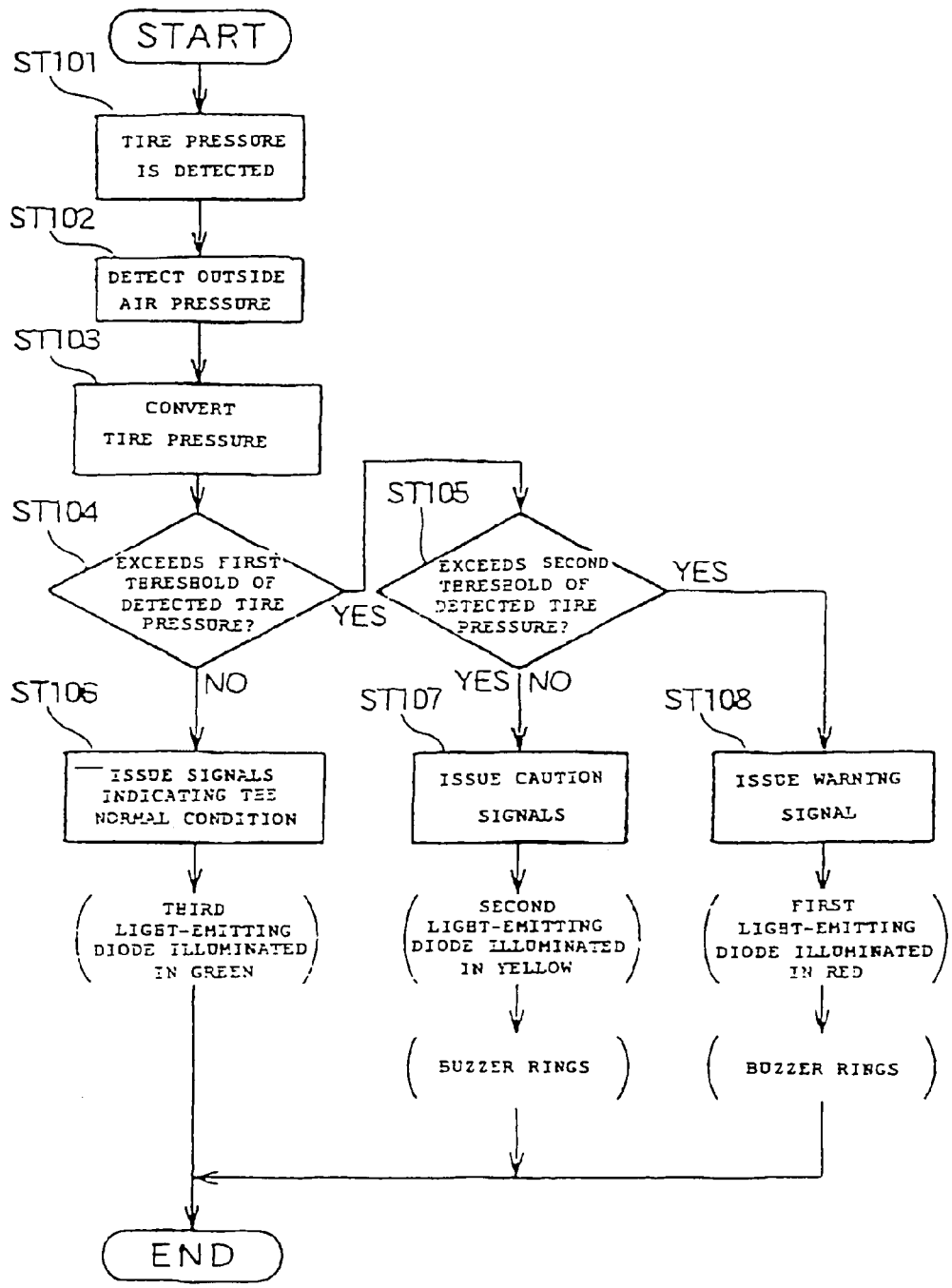
FIG. 14 is a flow chart of the tire pressure detecting system according to the third embodiment of the present invention.

FIG. 14 is a flow chart of the tire pressure detecting system according to the present invention (See FIG. 13 as for reference numerals). The reference sign and numeral STxxx represents step Nos.

ST101: the tire pressure is detected by the air pressure sensor 255.

ST102: the ambient air pressure is detected by the ambient air pressure 54.

ST103: the detected tire pressure is converted into the tire pressure obtained under the condition that the ambient air pressure is 1 atm, which is the reference atmospheric pressure.

ST1O4: Whether or not the tire pressure Pk exceeds a first threshold of detected tire pressure Pk1 is determined, where Pk is the converted tire pressure (corresponds to $p_{13}$ described above) and Pk1 is the first threshold of detected tire pressure Pk1 as a predetermined value under certain conditions (Pk>pk1). If NO, the procedure goes to ST1O6, and if YES, the procedure goes to ST105.

ST1O5: Whether or not the tire pressure Pk exceeds the second threshold of detected tire pressure Pk2 is determined, where Pk2 is the second threshold of detected tire pressure Pk2 as the value predetermined under certain conditions (Pk>Pk2). If NO, the procedure goes to ST1O7, and if YES, the procedure goes to ST1O8.

ST106: Signals indicating that the tire pressure Pk is normal are emitted. As a consequence, the third light emitting diode 86 emits a green light.

ST107: Caution signals are emitted. As a consequence, the second light emitting diode 85 emits yellow light and the buzzer 91 rings.

ST108: Warning signals are emitted. As a consequence, the first light emitting diode 84 emits red light and the buzzer 91 rings.

Figure 15:
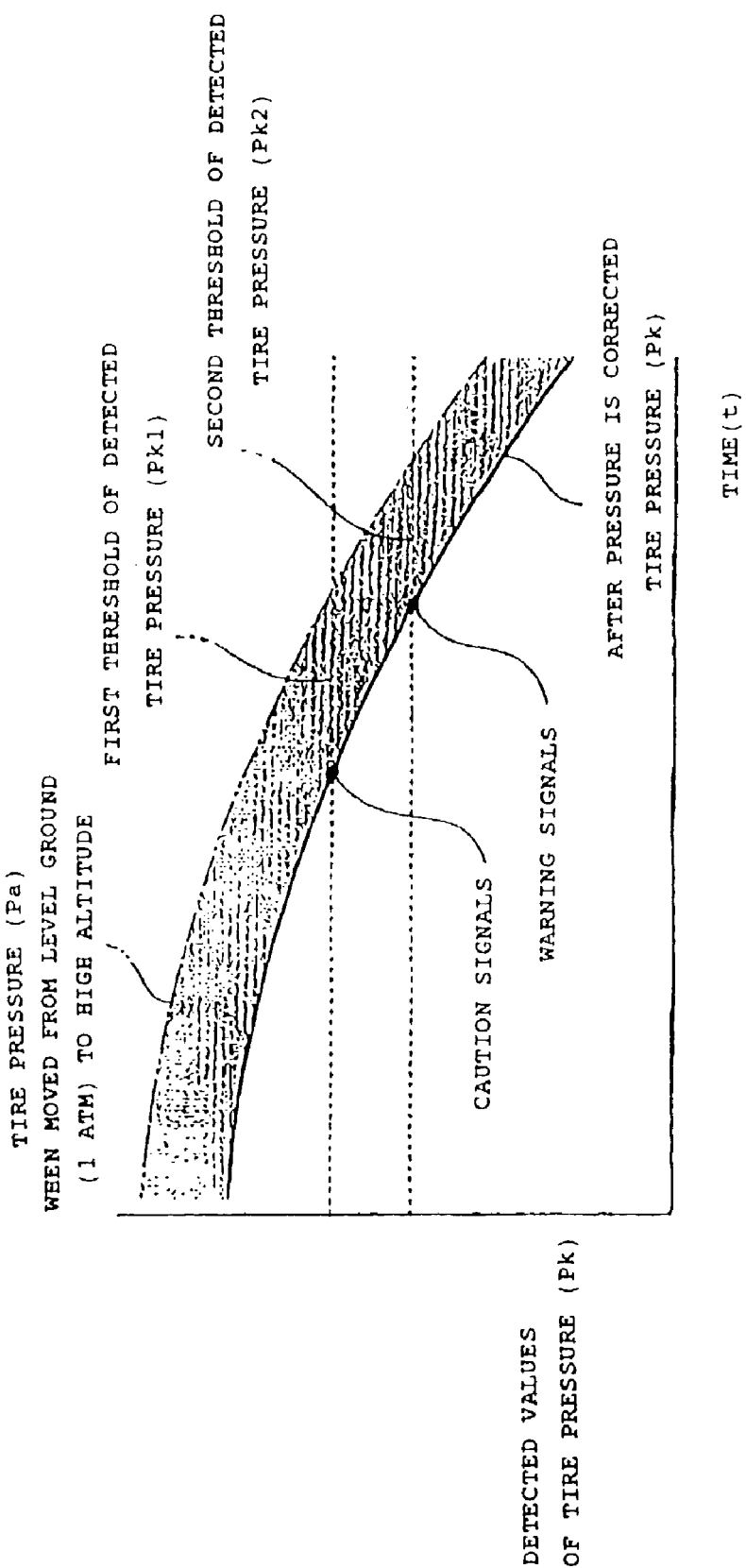
FIG. 15 is a graph of characteristics of the tire pressure detecting system according to the third embodiment of the present invention.
Figure 16A:
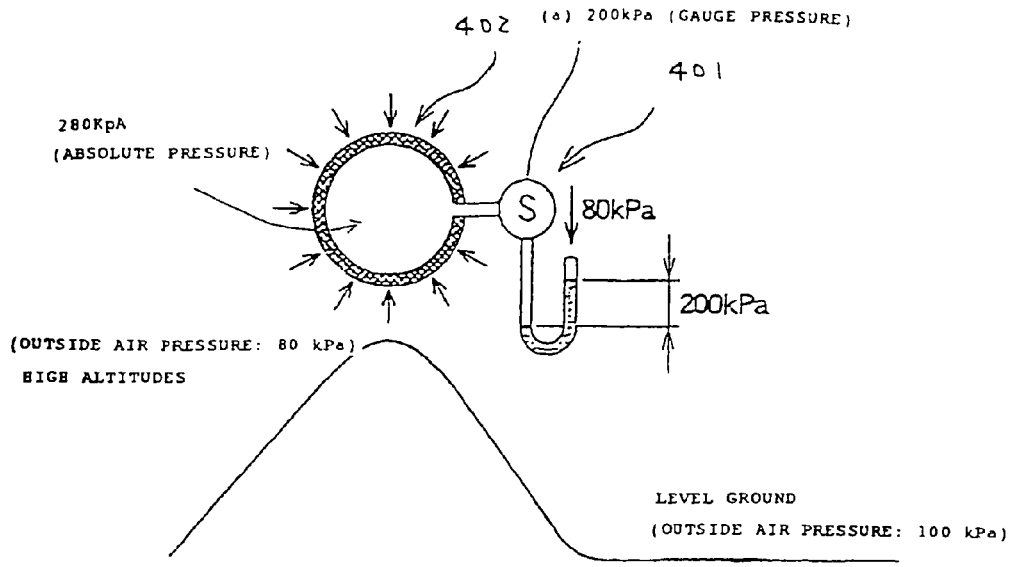
FIGS. 16a and 16b are explanatory drawings showing an example of the air pressure sensor used for a tire pressure alarm system in the related art.
Figure 16B:
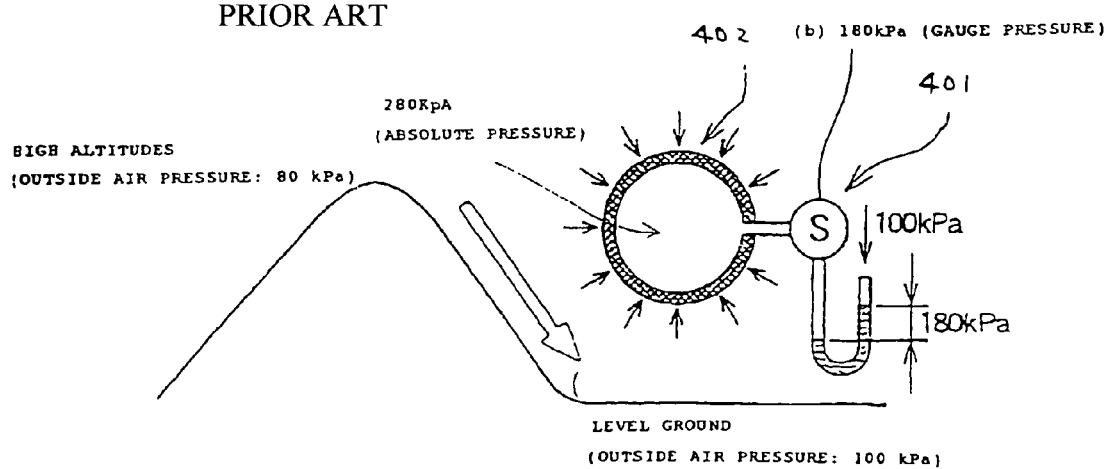

In FIG. 15, reference sign Pk represents the tire pressure after the pressure is corrected (converted), reference sign Pa represents the tire pressure when the vehicle is moved to high altitudes after the tire pressure is adjusted at the level ground (1 atm).

In other words, when the pressure is not corrected, the tire pressure drifts in the area defined by two curves of the tire pressure Pk and the tire pressure Pa when the motorcycle 10 (See FIG. 1) is moved from the level ground to high altitudes. Therefore, the first threshold of detected tire pressure Pk1 for issuing the predetermined caution signals and the second threshold of detected tire pressure Pk2 for issuing the warning signals vary as well, which is not preferable.

Therefore, the system is adapted to detect the ambient air pressure by the ambient air pressure sensor 54 and to convert the tire pressure detected by the air pressure sensor 255 into a pressure under the reference atmospheric pressure by the pressure converting unit 56 based on the ambient air pressure. Accordingly, the system may issue a warning when the tire pressure lies outside the value predetermined under certain conditions regardless of whether it is at a high altitude or on level ground. As a consequence, the convenience of the tire pressure management for the driver may be improved.

As shown in FIG. 1, although the vehicle in the third embodiment is described as the motorcycle 10, it is not limited to two-wheelers. Alternatively, the vehicle may be a four-wheeler or a three-wheeler.

As shown in FIG. 4, although the receiver 81 is provided on the meter panel 37 in the third embodiment, it is not limited thereto. For example, if it is a type that issues an alarm, it may be provided on a vehicle body frame or a helmet, and if it is a type using vibrations, it may be provided on a seat or on the helmet. The receiver 81 is described as a unit to be mounted on the front wheel 14 (See FIG. 1), it may be a unit for receiving information from the rear wheel 18.

Furthermore, in the third embodiment, as shown in FIG. 12, the ambient air pressure sensor 54 is provided in the grommet 51 of the front wheel 14. However, it is not limited thereto, and, for example, a sensor for detecting the ambient air pressure of a fuel injection system may be utilized. In this case, the pressure converting unit may be provided on the receiver.

With the arrangement described above, since this is a system wherein the occurrence of an air leak in a tire may be detected before the tire pressure has fallen to a value below a predetermined value, and an abrupt air leak and the like may also be recognized quickly, and that a warning is issued when the tire pressure has fallen to a value below a value predetermined under certain conditions, the system of the invention may be applied to various types of vehicles including two-wheelers, three-wheelers, and four-wheelers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire pressure detecting system wherein a tire pressure is detected by an air pressure sensor, comprising:
    a fluctuation warning unit for issuing a warning when fluctuations of the tire pressure per unit time exceed a predetermined threshold fluctuation; and
    a detected value warning unit for issuing a warning when a detected value of the tire pressure has fallen to a value below a predetermined threshold detected value.

2. The tire pressure detecting system according to claim 1, further including an air pressure determining unit disposed within a tire for determining if a warning is necessary.

3. The tire pressure detecting system according to claim 1, further including a transmitter disposed within a tire for transmitting pressure information outside the tire and a receiver disposed outside the tire for issuing a warning based on pressure information.

4. The tire pressure detecting system according to claim 3, wherein the transmitter includes an air pressure sensor for detecting the air pressure and said fluctuation warning unit calculates fluctuations of the tire pressure per unit time of the air pressure sensor, and wherein said detected value warning unit issues a warning when the detected value of the tire pressure has fallen to a value below the predetermined threshold detected value.

5. The tire pressure detecting system according to claim 1, wherein the detected value warning unit transmits a warning based on air leakage that cannot be detected during a slow variation of the tire pressure per unit time.

6. A tire pressure detecting system in which the tire pressure is detected by an air pressure sensor disposed on a wheel side, the detected tire pressure is issued from a transmitter disposed on the wheel side to a receiver disposed on a vehicle body side, and a warning is issued when the received detected tire pressure is outside a predetermined value comprising:
a temperature sensor for detecting air temperatures in the tire;
a pressure converting unit for converting the tire pressure detected by the air pressure sensor into a pressure at a predetermined temperature based on the air temperature detected by the temperature sensor; and
a transmission interval varying unit for shortening the interval of issuing a warning to the receiver when the converted pressure supplied from the pressure converting unit has fallen to a value below a predetermined threshold pressure.

7. The tire pressure detecting system according to claim 6, wherein said transmitter is disposed within a tire for transmitting pressure information outside the tire and a receiver is disposed outside the tire for issuing a warning based on pressure information.

8. The tire pressure detecting system according to claim 7, wherein the pressure converting unit provides a temperature correction to the air pressure based on the temperature of the air.

9. The tire pressure detecting system according to claim 6, and further including a detected value warning unit for detecting the tire pressure and transmitting a warning based on air leakage that cannot be detected during a slow variation of the tire pressure per unit time.

10. The tire pressure detecting system according to claim 6, further including a detected value warning unit for detecting the tire pressure and transmitting a warning based on air leakage that cannot be detected during a slow variation of the tire pressure per unit time.

11. A tire pressure detecting system wherein a tire pressure is detected by an air pressure sensor and a warning is issued when the tire pressure lies outside a predetermined value comprising:
an ambient air pressure sensor for detecting ambient air pressure;
a pressure converting unit for converting the tire pressure detected by the air pressure sensor into a pressure under a reference atmospheric pressure based on the ambient air pressure detected by the ambient air pressure sensor;
a transmitter disposed within a tire for transmitting pressure information outside the tire and a receiver disposed outside the tire for issuing a warning based on pressure information; and a detected value warning unit for detecting the tire pressure and transmitting a warning based on air leakage that cannot be detected during a slow variation of the tire pressure per unit time,
wherein the transmitter includes the air pressure sensor for detecting the air pressure and a fluctuation warning unit calculates fluctuations of the tire pressure per unit time of the air pressure sensor, and
wherein said detected value warning unit issues a warning when the detected value of the tire pressure has fallen to a value below the predetermined threshold detected value.

12. The tire pressure detecting system according to claim 11, wherein said air pressure sensor is disposed within a tire for determining if a warning is necessary.

13. A tire pressure detecting device, comprising:
an air pressure sensor configured to determine an air pressure of the tire;
a fluctuation determining unit configured to determine if fluctuations of the tire pressure per unit time exceed a predetermined fluctuation threshold;
a fluctuation warning unit configured to issue a warning when the fluctuation determining unit determines the fluctuations of the tire pressure exceed the predetermined fluctuation threshold.

14. The tire pressure detecting device of claim 13, wherein the predetermined fluctuation threshold comprises first and second predetermined fluctuation thresholds, and
wherein the fluctuation warning unit issues a caution signal when the fluctuation determining unit determines the fluctuations of the tire pressure exceed the predetermined first fluctuation threshold, and issues a warning signal when the fluctuation determining unit determines the fluctuations of the tire pressure exceed the predetermined first and second fluctuation thresholds, said warning signal indicating a more serious problem than the caution signal.

15. The tire pressure detecting device of claim 14, wherein the fluctuation warning unit issues a normal signal when the fluctuation determining unit determines the fluctuations of the tire pressure do not exceed the predetermined first fluctuation threshold.

16. The tire pressure detecting device of claim 15, further comprising:
an air pressure determination unit configured to determine when an air pressure of the tire determined by the air pressure sensor falls below a predetermined air pressure threshold; and
an air pressure warning unit configured to issue a warning when the air pressure determination unit determines the air pressure of the tire falls below the predetermined air pressure threshold.

17. The tire pressure detecting device of claim 16, wherein the predetermined air pressure threshold comprises first and second predetermined air pressure fluctuation thresholds, and
wherein the air pressure warning unit issues a caution signal when the air pressure determining unit determines the air pressure of the tire pressure falls below the predetermined first air pressure threshold, and issues a warning signal when the air pressure determining unit determines the air pressure of the tire pressure falls below the predetermined first and second air pressure thresholds, said warning signal indicating a more serious problem than the caution signal.

18. The tire pressure detecting device of claim 17, wherein the air pressure warning unit issues a normal signal when the air pressure determination unit determines the air pressure of the tire pressure does not exceed the predetermined first fluctuation threshold.

19. The tire pressure detecting device of claim 16, further comprising:
   a temperature sensor configured to determine a temperature of air in the tire; and
   an air pressure converting unit configured to convert the tire pressure determined by the air pressure sensor based on the determined temperature of the air in the tire,
   wherein the air pressure determination unit uses the converted air tire pressure in determining if the tire pressure falls below the predetermined air pressure threshold.

20. The tire pressure device of claim 17, further comprising:
   an ambient air pressure sensor configured to determined an ambient air pressure; and
   a pressure converting unit configured to convert the air pressure determined by the air pressure sensor using a reference atmospheric pressure and the ambient air pressure sensor determined by the ambient air pressure sensor,
   wherein the air pressure determination unit uses the converted air tire pressure in determining if the tire pressure falls below the predetermined air pressure threshold.

21. The tire pressure device of claim 16, wherein the air pressure sensor, the fluctuation determining unit, and the fluctuation warning unit are installed within a tire of a motorcycle, and the tire pressure device further includes a transmitter held by a grommet of the tire, said transmitter configured to transmit corresponding information determined by the air pressure sensor and the fluctuation determining unit to a receiver located on a meter panel of the motorcycle.

* * * * *